(12) United States Patent
Eto et al.

(10) Patent No.: US 7,905,210 B2
(45) Date of Patent: Mar. 15, 2011

(54) ENGINE VIBRATION ELIMINATION SYSTEM AND VARIABLE STROKE CHARACTERISTIC ENGINE

(75) Inventors: Koichi Eto, Wako (JP); Akinori Maezuru, Wako (JP); Kouichi Ikoma, Wako (JP); Kazuhiko Iso, Wako (JP); Yoshihiro Okada, Wako (JP); Masakazu Kinoshita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 744 days.

(21) Appl. No.: 11/666,222

(22) PCT Filed: Nov. 8, 2005

(86) PCT No.: PCT/JP2005/020413
§ 371 (c)(1),
(2), (4) Date: Apr. 25, 2007

(87) PCT Pub. No.: WO2006/049294
PCT Pub. Date: May 11, 2006

(65) Prior Publication Data
US 2007/0289567 A1 Dec. 20, 2007

(30) Foreign Application Priority Data

| Nov. 8, 2004 | (JP) | 2004-323405 |
| Nov. 18, 2004 | (JP) | 2004-334108 |
| Dec. 28, 2004 | (JP) | 2004-380269 |
| Jan. 26, 2005 | (JP) | 2005-017691 |
| Jan. 26, 2005 | (JP) | 2005-017692 |

(51) Int. Cl.
*F02B 75/06* (2006.01)
(52) U.S. Cl. ............ 123/192.1; 123/192.2; 123/48 R; 123/48 B; 123/78 R
(58) Field of Classification Search .......... 123/48 B, 123/48 A, 48 R, 78 R, 78 A, 192.1, 192.2; 74/574.2, 603; 464/180
See application file for complete search history.

(56) References Cited

U.S. PATENT DOCUMENTS
3,511,110 A * 5/1970 Grieve ................ 74/604
(Continued)

FOREIGN PATENT DOCUMENTS
DE 38 42 366 A1 7/1989
(Continued)

OTHER PUBLICATIONS

Nikorasu P. Chironisu, "(2)/*Jitsurei Mechanical Control* (1)", Jidoka Books, Aug. 10, 1979, p. 117, Kabushiki Kaisha Taiga Shuppan.

*Primary Examiner* — Michael Cuff
*Assistant Examiner* — Hung Q Nguyen
(74) *Attorney, Agent, or Firm* — Arent Fox, LLP

(57) ABSTRACT

Secondary vibration generated accompanying reciprocation of a piston (21) of a multi-link variable compression ratio engine (E) can be eliminated effectively, even when the direction of the secondary vibration is inclined relative to a cylinder axis (L1), by inclining the direction (shown by arrow) of an excitation force generated by a secondary balancer system (43) so that it coincides with the direction of the secondary vibration. The secondary balancer system (43) is formed by supporting balancer weights (44a, 45a) on a pair of balancer shafts (44, 45) rotating in directions opposite to each other, and by displacing the phases of these balancer weights (44a, 45a) the direction of the excitation force generated can be inclined so as to coincide with the direction of secondary vibration of the engine (E).

8 Claims, 24 Drawing Sheets

U.S. PATENT DOCUMENTS

| | | | |
|---|---|---|---|
| 4,569,316 A * | 2/1986 | Suzuki | 123/192.1 |
| 4,703,725 A * | 11/1987 | Weertman | 123/192.2 |
| 4,712,436 A * | 12/1987 | Brown | 74/44 |
| 4,936,268 A * | 6/1990 | Randle | 123/192.2 |
| 5,305,656 A * | 4/1994 | Kamiya et al. | 74/604 |
| 5,875,753 A * | 3/1999 | Ishikawa | 123/192.2 |
| 6,286,474 B1 * | 9/2001 | Downs et al. | 123/192.2 |
| 6,626,139 B1 * | 9/2003 | Horita et al. | 123/192.2 |
| 6,637,384 B1 | 10/2003 | Mendler | |
| 6,877,463 B2 * | 4/2005 | Moteki et al. | 123/48 B |
| 2003/0145821 A1 * | 8/2003 | Hashimoto et al. | 123/192.2 |
| 2005/0103304 A1 * | 5/2005 | Yamada et al. | 123/192.2 |

FOREIGN PATENT DOCUMENTS

| | | |
|---|---|---|
| DE | 42 11 629 A1 | 10/1993 |
| JP | 52-145203 | 11/1977 |
| JP | 56-118908 | 9/1981 |
| JP | 62-224751 A | 10/1987 |
| JP | 4-249640 A | 9/1992 |
| JP | 4-307145 A | 10/1992 |
| JP | 06-081900 A | 3/1994 |
| JP | 9-228858 A | 9/1997 |
| JP | 2000-88058 A | 3/2000 |
| JP | 2001-227367 A | 8/2001 |
| JP | 2002-174131 A | 6/2002 |
| JP | 2002-188455 A | 7/2002 |
| JP | 2002-227674 A | 8/2002 |
| JP | 2003-322036 A | 11/2003 |
| JP | 2004-150353 A | 5/2004 |
| JP | 2004-183644 A | 7/2004 |
| JP | 2004-239182 | 8/2004 |
| JP | 2004-239182 A | 8/2004 |
| JP | 2004239182 * | 8/2004 |

* cited by examiner

— EMBODIMENT (HIGH COMPRESSION RATIO)
— EMBODIMENT (LOW COMPRESSION RATIO)
---- COMPARATIVE EXAMPLE (HIGH COMPRESSION RATIO)
---- COMPARATIVE EXAMPLE (LOW COMPRESSION RATIO)

US 7,905,210 B2

ENGINE VIBRATION ELIMINATION SYSTEM AND VARIABLE STROKE CHARACTERISTIC ENGINE

CROSS-REFERENCE TO RELATED APPLICATION

This application is a National Stage entry of International Application No. PCT/JP2005/020413, filed Nov. 8, 2005, the entire specification claims and drawings of which are incorporated herewith by reference.

TECHNICAL FIELD

The present invention relates to an engine vibration elimination system that eliminates, by means of a balancer system, vibration of an engine in which the direction of vibration generated accompanying reciprocation of a piston is inclined relative to a cylinder axis.

Furthermore, the present invention relates to an engine vibration elimination system that includes a variable stroke characteristic mechanism for changing piston stroke characteristics and a balancer system for reducing vibration accompanying running of an engine and, moreover, to an engine vibration elimination system that includes a variable stroke characteristic mechanism for changing piston stroke characteristics and a secondary balancer system for reducing secondary vibration accompanying reciprocation of a piston.

Moreover, the present invention relates to an engine vibration elimination system that includes a variable stroke characteristic mechanism for changing piston stroke characteristics according to a running state and a secondary balancer system for reducing secondary vibration accompanying reciprocation of a piston.

Furthermore, the present invention relates to a variable stroke characteristic engine and, in particular, to a variable stroke characteristic engine that is arranged so that vibration can be reduced without incurring any decrease in the degree of freedom of design of a variable stroke characteristic mechanism.

Moreover, the present invention relates to a variable stroke characteristic engine and, in particular, to a variable stroke characteristic engine that is arranged so that any increase in the dimensions of a crankcase can be suppressed while providing a balancer shaft for reducing a secondary vibration component caused by movement of a variable stroke characteristic mechanism.

BACKGROUND ART

In a normal engine in which a piston and a crankshaft disposed on a cylinder axis are connected via a connecting rod, since the direction of secondary vibration of the engine is parallel to the direction of the cylinder axis, a pair of balancer shafts of a secondary balancer system are generally arranged symmetrically on opposite sides of the crankshaft.

In an arrangement described in Patent Publication 1 below, in order to eliminate a roll moment due to secondary vibration of an engine, a pair of balancer shafts arranged on opposite sides of a crankshaft are staggered in a cylinder axis direction, and the phases of balancer weights provided on these balancer shafts are arranged symmetrically relative to the cylinder axis.

Patent Publication 1: Japanese Utility Model Registration Application Laid-open No. 56-118908

Furthermore, a multi-link engine in which a lower link is pivotably supported on a crankpin of a crankshaft, this lower link is connected to a piston via an upper link, the lower link is connected via a control link to a control shaft supported in an engine block, and the compression ratio is changed by changing the position of one end of the control link by rotating the control shaft by means of an actuator is known from Patent Publications 2 and 3 below.

Patent Publication 2: Japanese Patent Application Laid-open No. 2002-188455

Patent Publication 3: Japanese Patent Application Laid-open No. 2002-174131

Moreover, a variable compression ratio engine that includes a first link connected to a piston, a second link providing a connection between the first link and a crankshaft, and a third link having one end connected to the second link and the other end connected to an engine main body via an eccentric shaft has been proposed in, for example, Patent Publication 4. Furthermore, a variable compression ratio engine that includes a first link connected to a piston, a second link providing a connection between the first link and a crankshaft, and a third link having one end connected to the first link and the other end connected to an engine main body via an eccentric shaft has been proposed in, for example, Patent Publication 5.

Moreover, a variable stroke characteristic engine in which a plurality of links provide a connection between a piston and a crankshaft and the piston stroke is changed by moving an end of one link that is connected to an engine main body has been proposed in, for example, Patent Publications 4 and 5, etc.

Patent Publication 4: Japanese Patent Application Laid-open No. 9-228858

Patent Publication 5: Japanese Patent Application Laid-open No. 2004-150353

On the other hand, an excitation force due to the movement of a piston acts on a reciprocating engine, and since it is difficult to reduce this vibration by means of the cylinder order or a counter weight provided integrally with a crankshaft, an arrangement in which in the multi-link reciprocating engine an attempt is made to reduce the vibration by optimizing the link length or the link position (link geometry) has been proposed in Patent Publication 6.

Furthermore, an excitation force containing primary and secondary vibration components due to the movement of a piston and a connecting rod acts on a reciprocating engine, and since it is difficult to reduce secondary rotational vibration by means of the cylinder order or a counter weight provided integrally with a crankshaft, an arrangement in which in the multi-link reciprocating engine an attempt is made to reduce the vibration by optimizing the link length or the link position (link geometry) has been proposed in Patent Publication 6.

Patent Publication 6: Japanese Patent Application Laid-open No. 2001-227367

DISCLOSURE OF INVENTION

Problems to be Solved by the Invention

In a multi-link engine that includes links other than a connecting rod, since these links are arranged asymmetrically relative to a cylinder axis, the direction of vibration generated accompanying reciprocation of a piston is inclined relative to the direction of the cylinder axis. Therefore, when such an engine is equipped with a conventional secondary balancer system, even if, in the above-mentioned vibration, vibration in a direction along the cylinder axis can be eliminated, there is the problem that vibration in a direction perpendicular to the cylinder axis and the crankshaft cannot be eliminated. Moreover, when a control shaft is rotated in order to change the compression ratio, the positional relationship of a plurality of links is displaced, and the vibrational characteristics, particularly the direction of the secondary vibration, change.

There is therefore the problem that, even if an attempt is made to reduce the secondary vibration by equipping such an engine with a secondary balancer system, it is difficult to reduce both the secondary vibration when the engine is in a high compression ratio state and the secondary vibration when it is in a low compression ratio state.

Furthermore, in a multi-link reciprocating engine, it is difficult in practice to realize an arrangement of links that can sufficiently reduce the vibration within the limited capacity of a crankcase; if the reduction of vibration is given priority, the degree of freedom in the design of the links is greatly limited, and there is the problem that the dimensions of the engine inevitably increase.

Moreover, in a multi-link reciprocating engine, it is difficult in practice to realize within the limited capacity of a crankcase a variable mechanism that can sufficiently reduce the secondary vibration component while satisfying design requirements such as a variable compression ratio or piston stroke, a movable range of a link, etc. forming the variable mechanism, stress acting on a member forming the variable mechanism, and the overall dimensions of the engine.

The present invention has been accomplished under these circumstances, and it is a first object thereof to eliminate effectively vibration of an engine generated in a direction inclined relative to a cylinder axis accompanying reciprocation of a piston. This first object corresponds to the objects of first to third embodiments.

Furthermore, it is a second object of the present invention to eliminate effectively vibration of an engine that can switch between a plurality of running states having different piston stroke characteristics. This second object corresponds to the object of a fourth embodiment.

Moreover, it is a third object of the present invention to eliminate effectively secondary vibration of an engine that can switch between a plurality of running states having different piston stroke characteristics. This third object corresponds to the object of a fifth embodiment.

Furthermore, it is a fourth object of the present invention to provide a variable stroke characteristic engine that can sufficiently reduce vibration while realizing a high degree of freedom in link design and without incurring an increase in dimensions of the engine. This fourth object corresponds to the object of a sixth embodiment.

Moreover, it is a fifth object of the present invention to provide a variable stroke characteristic engine that can achieve a balance at a high level between realizing sufficient vibration suppression and suppressing any increase in the dimensions of the engine. This fifth object corresponds to the object of the sixth embodiment.

Means for Solving the Problems

In order to attain the first object, according to a first aspect of the present invention, there is proposed an engine vibration elimination system that eliminates, by means of a balancer system, vibration of an engine in which the direction of vibration generated accompanying reciprocation of a piston is inclined relative to a cylinder axis, characterized in that the direction of an excitation force generated by the balancer system is inclined toward the direction of the vibration generated accompanying reciprocation of the piston.

According to a second aspect of the present invention, there is proposed an engine vibration elimination system that eliminates, by means of a balancer system, vibration of an engine in which the direction of vibration generated accompanying reciprocation of a piston is inclined relative to the cylinder axis, characterized in that the engine is a variable stroke characteristic engine in which at least one of top dead center and bottom dead center can be varied, and the direction of an excitation force generated by the balancer system is inclined toward the direction of vibration generated accompanying reciprocation of the piston.

According to a third aspect of the present invention, in addition to the first or second aspect, there is proposed the engine vibration elimination system, wherein the angle that the direction of the excitation force generated by the balancer system forms relative to the cylinder axis is made to coincide with the angle that the direction of the vibration generated accompanying reciprocation of the piston forms relative to the cylinder axis.

According to a fourth aspect of the present invention, in addition to any one of the first to third aspects, there is proposed the engine vibration elimination system, wherein the balancer system comprises balancer weights supported on a pair of balancer shafts rotating in directions opposite to each other, and the phases of the balancer weights are set so that the direction of an excitation force generated by these balancer weights is inclined toward the direction of vibration generated accompanying reciprocation of the piston.

According to a fifth aspect of the present invention, in addition to the fourth aspect, there is proposed the engine vibration elimination system, wherein the phase of one of the pair of balancer weights is displaced from the phase of the other by a predetermined angle.

According to a sixth aspect of the present invention, in addition to any one of the first to third aspects, there is proposed the engine vibration elimination system, wherein the engine has the cylinder axis inclined relative to the vertical direction, the balancer system comprises a pair of balancer shafts rotating in directions opposite to each other, and a straight line passing through the centers of the pair of balancer shafts is disposed horizontally.

In order to attain the second object, according to a seventh aspect of the present invention, there is proposed an engine vibration elimination system comprising a variable stroke characteristic mechanism for changing the stroke characteristics of a piston and a balancer system for reducing vibration accompanying running of an engine, characterized in that the direction of an excitation force generated by the balancer system is set so as to suppress a change in vibration when switching running states.

According to an eighth aspect of the present invention, there is proposed an engine vibration elimination system comprising a variable stroke characteristic mechanism for changing the stroke characteristics of a piston and a secondary balancer system for reducing secondary vibration accompanying reciprocation of the piston, characterized in that the direction of an excitation force generated by the secondary balancer system is set so as to be between the direction of an excitation force for suppressing secondary vibration in a first running state and the direction of an excitation force for suppressing secondary vibration in a second running state.

According to a ninth aspect of the present invention, in addition to the eighth aspect, there is proposed the engine vibration elimination system, wherein the direction of the excitation force generated by the secondary balancer system is set so that the amplitude of secondary vibration in the first running state is substantially equal to the amplitude of secondary vibration in the second running state.

In order to attain the third object, according to a tenth aspect of the present invention, there is proposed an engine vibration elimination system comprising a variable stroke characteristic mechanism for changing the stroke characteristics of a piston according to a running state and a secondary balancer system for reducing secondary vibration accompanying reciprocation of the piston, characterized in that the secondary balancer system comprises a first balancer shaft driven by a crankshaft, a second balancer shaft driven by the first balancer shaft, and a variable phase mechanism for changing the phase of the first balancer shaft relative to the phase of the crankshaft according to a running state.

According to an eleventh aspect of the present invention, in addition the tenth aspect, there is proposed the engine vibration elimination system, wherein the system comprises a second variable phase mechanism for changing the phase of the second balancer shaft relative to the phase of the first balancer shaft according to a running state.

In order to attain the fourth object, according to a twelfth aspect of the present invention, there is proposed a variable stroke characteristic engine comprising a first link connected to a piston, a second link that provides a connection between the first link and a crankshaft, and a third link that has one end connected to the first link or the second link and the other end movably supported on an engine main body, wherein the engine has a vibration reduction system for reducing vibration generated due to swinging of each of the links.

According to a thirteenth aspect of the present invention, in addition to the twelfth aspect, there is proposed the variable stroke characteristic engine, wherein the vibration reduction system is provided further inside the crankcase than the third link.

According to a fourteenth aspect of the present invention, in addition to the twelfth or thirteenth aspect, there is proposed the variable stroke characteristic engine, wherein at least one part of the third link is positioned lower than an upper end face of the vibration reduction system.

According to a fifteenth aspect of the present invention, in addition to any one of the twelfth to fourteenth aspects, there is proposed the variable stroke characteristic engine, wherein the vibration reduction system is provided at a position biased in a direction opposite to the third link relative to the shaft center of the crankshaft.

In order to attain the fifth object, according to a sixteenth aspect of the present invention, there is proposed a variable stroke characteristic engine comprising a first link connected to a piston, a second link that provides a connection between the first link and a crankshaft, and a third link that has one end connected to the first link or the second link and the other end movably supported on an engine main body via an eccentric shaft, wherein a pair of balancer shafts for reducing vibration generated due to swinging of each of the links extend parallel to the crankshaft, and the pivot center of the eccentric shaft is biased in the sliding direction of the piston relative to a plane that passes through the center of the balancer shaft on the side closer to the eccentric shaft and that is perpendicular to the sliding axis of the piston.

According to a seventeenth aspect of the present invention, there is proposed a variable stroke characteristic engine comprising a first link connected to a piston, a second link that provides a connection between the first link and a crankshaft, and a third link that has one end connected to the first link or the second link and the other end movably supported on an engine main body via an eccentric shaft, wherein a pair of balancer shafts for reducing vibration generated due to swinging of each of the links extend parallel to the crankshaft and are connected to the crankshaft via power transmitting means, and the power transmission means is disposed so as to be displaced from the third link in the axial direction of the crankshaft.

According to an eighteenth aspect of the present invention, there is proposed a variable stroke characteristic engine comprising a first link connected to a piston, a second link that provides a connection between the first link and a crankshaft, and a third link that has one end connected to the first link or the second link and the other end movably supported on an engine main body via an eccentric shaft, wherein a pair of balancer shafts for reducing vibration generated due to swinging of each of the links extend parallel to the crankshaft and are connected via coupling means, and the coupling means is disposed so as to be displaced from the third link in the axial direction of the crankshaft.

According to a nineteenth aspect of the present invention, there is proposed a variable stroke characteristic engine comprising a first link connected to a piston, a second link that provides a connection between the first link and a crankshaft, and a third link that has one end connected to the first link or the second link and the other end movably supported on an engine main body via an eccentric shaft, wherein a pair of balancer shafts for reducing vibration generated due to swinging of each of the links extend parallel to the crankshaft and are housed in a casing, and a recess is formed in the casing and the casing is disposed within the crankcase so that the recess faces the third link.

Effects of the Invention

In accordance with the arrangement of the first aspect, even when the direction of vibration generated accompanying reciprocation of the piston is inclined relative to the cylinder axis, inclining the direction of the excitation force generated by the balancer system toward the direction of the vibration enables the vibration to be eliminated effectively.

In accordance with the arrangement of the second aspect, since the engine is a variable stroke characteristic engine in which at least one of top dead center and bottom dead center is variable, even if the direction of vibration generated accompanying reciprocation of the piston is inclined relative to the cylinder axis, inclining the direction of the excitation force generated by the balancer system toward the direction of the vibration enables the vibration to be eliminated effectively.

In accordance with the arrangement of the third aspect, since the angle formed by the direction of the excitation force generated by the balancer system relative to the cylinder axis is made to coincide with the angle that the direction of vibration generated accompanying reciprocation of the piston forms relative to the cylinder axis, the vibration can be eliminated more effectively.

In accordance with the arrangement of the fourth aspect, since there is provided the balancer system in which the balancer weights are supported with predetermined phases on the pair of balancer shafts rotating in directions opposite to each other, and the direction of the excitation force generated by these balancer weights is inclined toward the direction of the vibration generated accompanying reciprocation of the piston, it is possible to counterbalance and eliminate the vibration by means of the excitation force generated by the balancer weights.

In accordance with the arrangement of the fifth aspect, since the phase of one of the pair of balancer weights is displaced by a predetermined angle from the phase of the other, it is possible to freely adjust the direction of the excitation force.

In accordance with the arrangement of the sixth aspect, when the cylinder axis of the engine is inclined relative to the vertical direction, arranging the pair of balancer shafts so that the straight line passing through the centers thereof is horizontal enables the distance between the balancer system and an oil pan to be made short.

In accordance with the arrangement of the seventh aspect, even if the vibration state changes when the engine switches running states, since the direction of the excitation force generated by the balancer system is set so as to suppress the change, it is possible to suppress the vibration effectively regardless of the engine running state.

In accordance with the arrangement of the eighth aspect, even if the direction of the secondary vibration generated accompanying reciprocation of the piston is different between the first running state and the second running state, since the direction of the excitation force generated by the secondary balancer system is set so as to be intermediate between the direction of the excitation force that suppresses secondary vibration in the first running state and the direction of the excitation force that suppresses secondary vibration in the second running state, it is possible to suppress secondary vibration effectively in both the first and second running states.

In accordance with the arrangement of the ninth aspect, since the direction of the excitation force generated by the secondary balancer system is set so that the amplitude of the secondary vibration is substantially identical for the first and second running states, it is possible to suppress secondary vibration in both the first and second running states more effectively.

In accordance with the arrangement of the tenth aspect, even if the direction of the secondary vibration generated accompanying reciprocation of the piston changes according to the engine running state, since it is possible to make the direction of the excitation force generated by the secondary balancer system closer to the direction of the secondary vibration by changing the phases of the first and second balancer shafts relative to the phase of the crankshaft by means of the variable phase mechanism, it is possible to suppress the secondary vibration effectively regardless of the engine running state.

In accordance with the arrangement of the eleventh aspect, it becomes possible to independently change the phases of the first and second balancer shafts relative to the phase of the crankshaft by changing the phase of the second balancer shaft relative to the phase of the first balancer shaft by means of the second variable phase mechanism, and it is possible to suppress more effectively the secondary vibration of the engine by making the direction of the excitation force generated by the secondary balancer system closer to the direction of the secondary vibration with higher precision.

In accordance with the arrangement of the twelfth aspect, since the vibration due to the operation of the variable stroke characteristic mechanism can be reduced by the vibration reduction system even if the weight and geometry of the link of the variable stroke characteristic mechanism are set without placing much importance thereon, it is possible to achieve a substantial effect in greatly improving the degree of freedom in design of the variable stroke characteristic mechanism and avoiding increasing the dimensions of the engine.

In accordance with the arrangement of the thirteenth aspect, since the space inward of the third link can be utilized effectively, it is possible to avoid increasing the dimensions of the engine even when the multi-link variable stroke characteristic mechanism is combined with the vibration reduction system.

In accordance with the arrangement of the fourteenth aspect, since the third link can be arranged in a space between the vibration reduction system and the crankcase opposite the vibration reduction system, it is possible to avoid increasing the dimensions of the engine.

In accordance with the arrangement of the fifteenth aspect, since the space on the side opposite to the third link can be utilized effectively, it is possible to avoid increasing the dimensions of the engine while avoiding interference between the vibration reduction system and the third link.

In accordance with the arrangement of the sixteenth aspect, since the balancer shaft and the eccentric shaft can be arranged in proximity to each other, it is possible to achieve a considerable effect in avoiding increasing the dimensions of the engine crankcase even when the multi-link variable stroke characteristic mechanism is combined with the vibration reduction system.

In accordance with the arrangement of the seventeenth aspect, since it is possible to avoid interference between the third link and the power transmission means for transmitting the rotational force of the crankshaft to the balancer shaft, it is possible to bring the balancer shaft and the third link still closer to each other, thereby suppressing any increase in the dimensions of the engine.

In accordance with the arrangement of the eighteenth aspect, since it is possible to avoid interference between the third link and the coupling means for the two balancer shafts, it is possible to bring the balancer shaft and the third link still closer to each other, thereby suppressing any increase in the dimensions of the engine.

In accordance with the arrangement of the nineteenth aspect, it is possible to bring the third link and the casing housing the balancer shaft still closer to each other, thereby suppressing any increase in the dimensions of the engine.

EXPLANATION OF REFERENCE NUMERALS AND SYMBOLS

Figure 1:
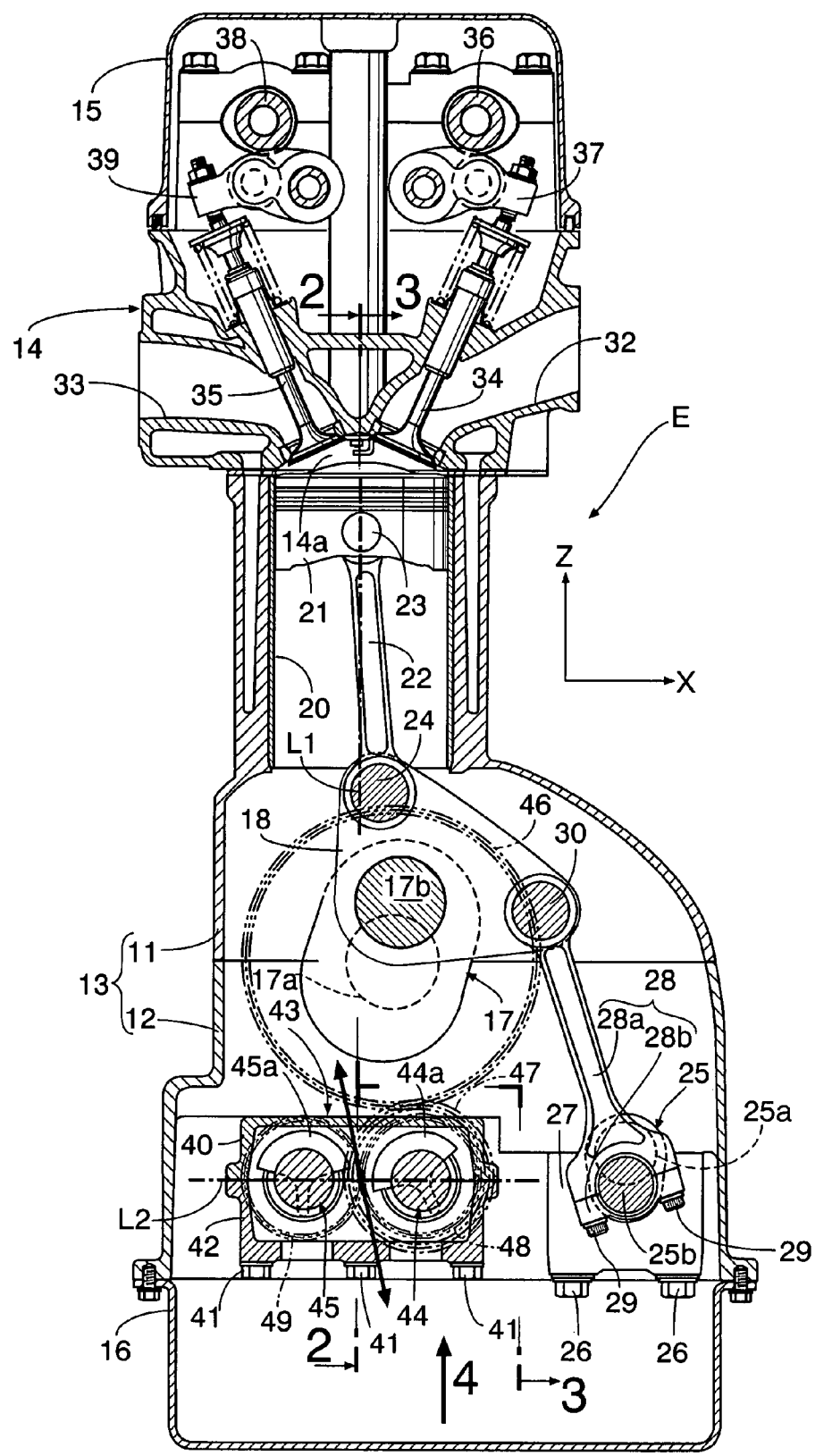
FIG. 1 is a vertical sectional view of a variable compression ratio engine (high compression ratio state) (first embodiment).
Figure 2:
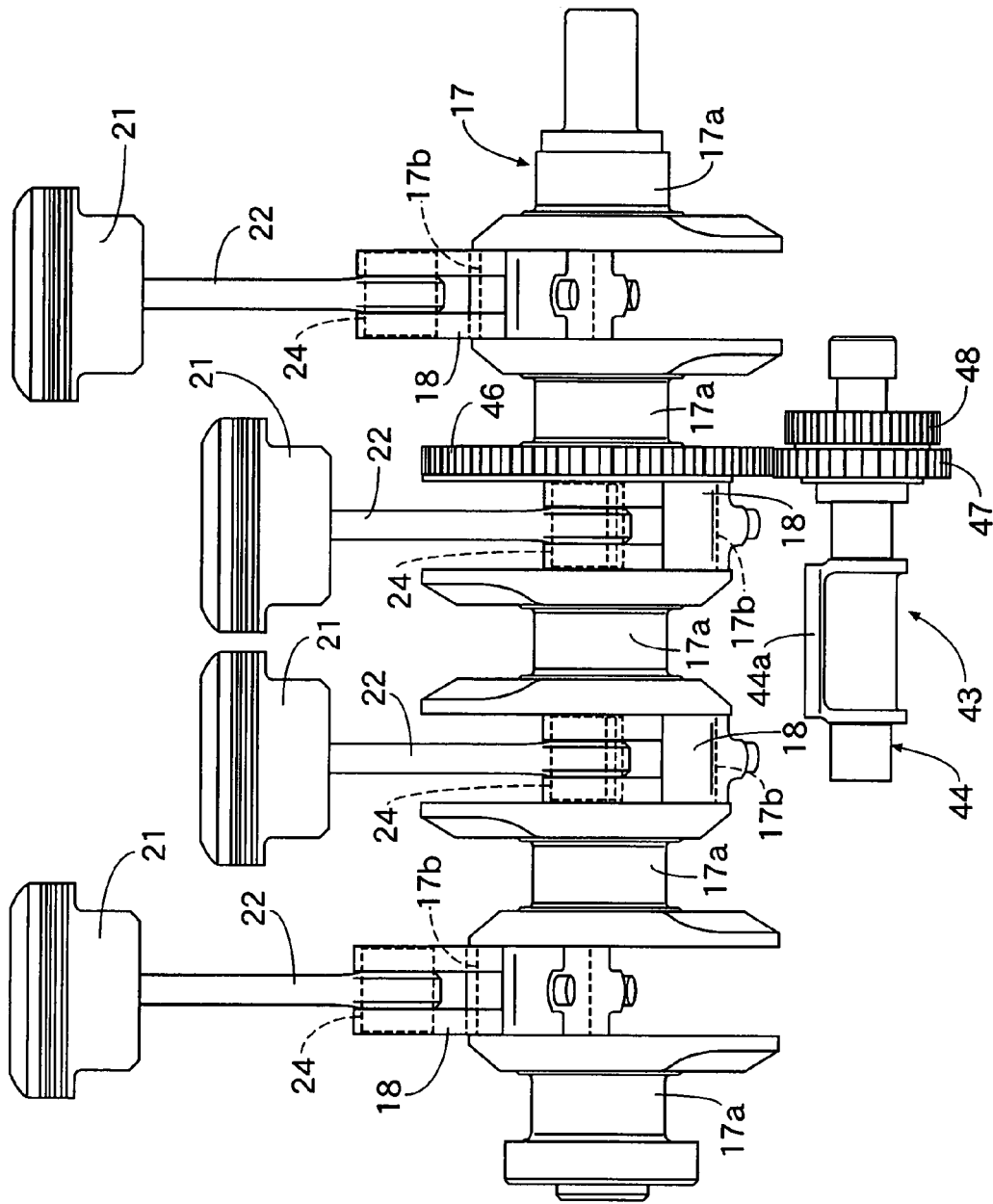
FIG. 2 is a view from arrowed line 2-2 in FIG. 1 (first embodiment).
Figure 3:
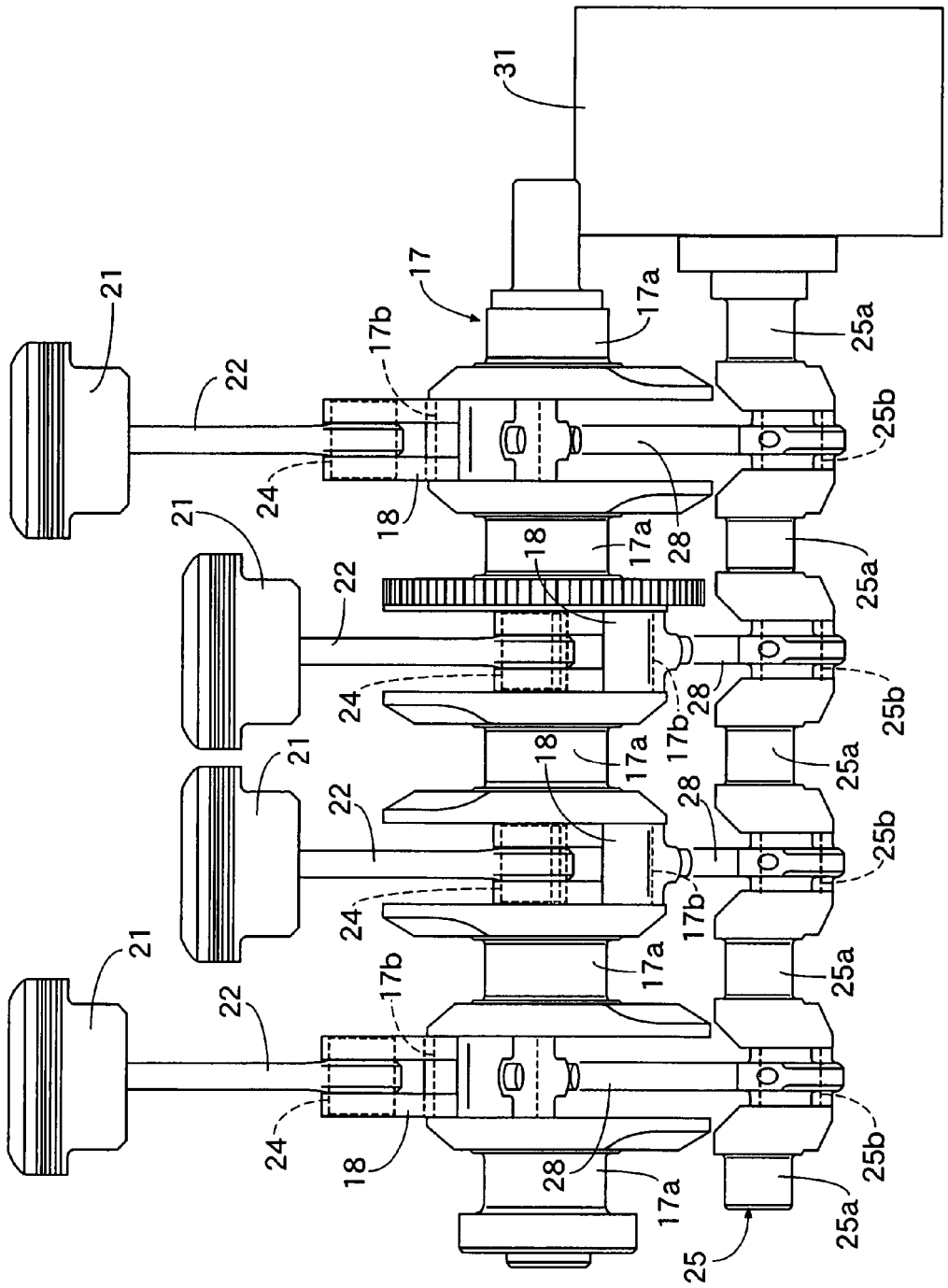
FIG. 3 is a view from arrowed line 3-3 in FIG. 1 (first embodiment).
Figure 4:
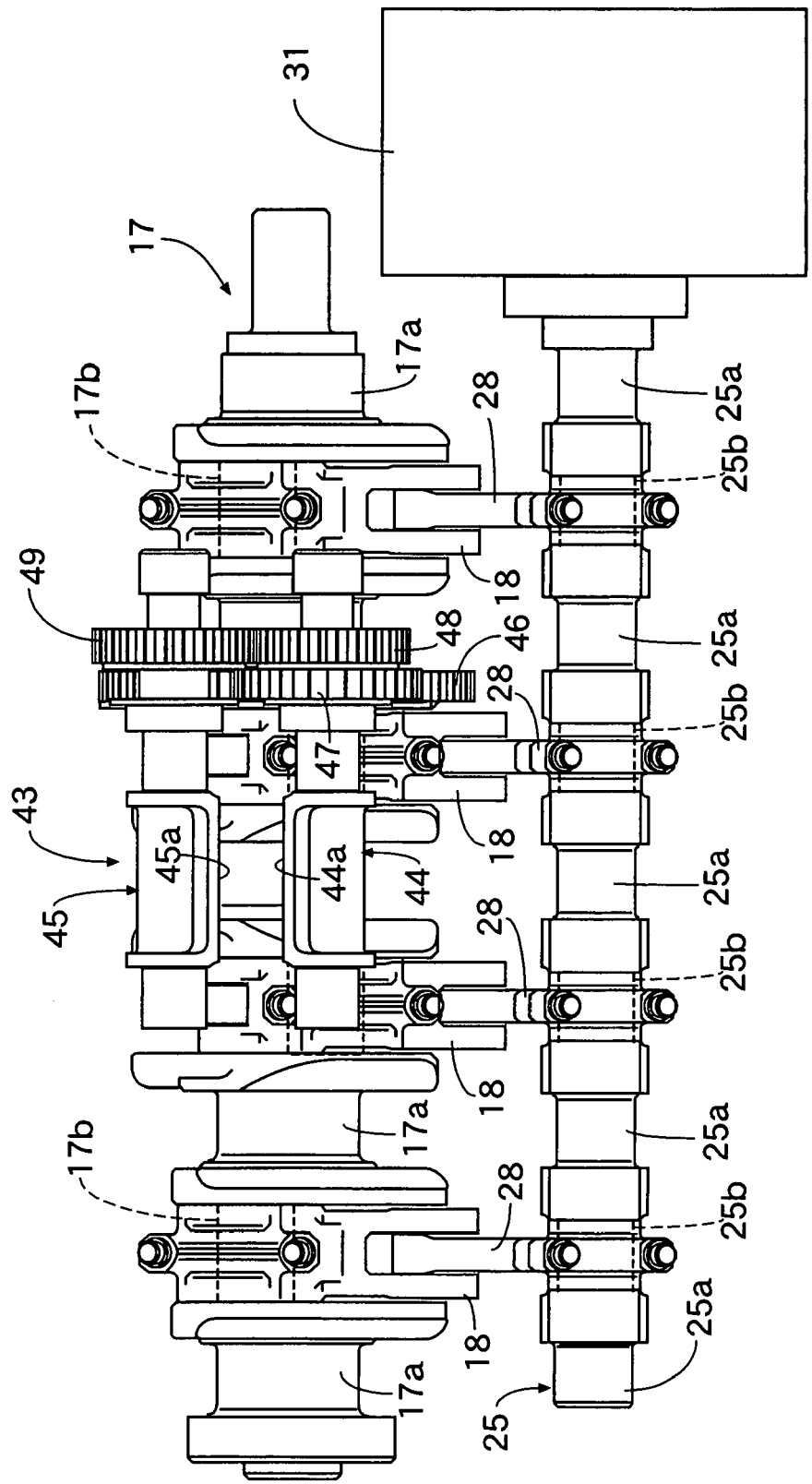
FIG. 4 is a view from arrow 4 in FIG. 1 (first embodiment).

17 Crankshaft
21 Piston
43 Secondary Balancer System (Balancer System)
44 First Balancer Shaft (Balancer Shaft)
44a First Balancer Weight (Balancer Weight)
45 Second Balancer Shaft (Balancer Shaft)
45a Second Balancer Weight (Balancer Weight)
61 First Variable Phase Mechanism (Variable Phase Mechanism)
62 Second Variable Phase Mechanism
103 Piston
104 First Link
105 Second Link
106 Crankshaft
107 Crankcase (Engine Main Body)
112 Third Link
113 Eccentric Shaft
121 Vibration Reduction System
122a Balancer Shaft
122b Balancer Shaft
123a Upper Casing (Casing)
123b Lower Casing (Casing)
124a Coupling gear (Coupling means)
124b Coupling gear (Coupling means)
125 Driven Gear (Power Transmission System)
126 Drive Gear (Power Transmission System)
131 Recess
E Engine
L1 Cylinder Axis
L2 Straight Line Passing through Centers of Pair of Balancer Shafts

BEST MODE FOR CARRYING OUT THE INVENTION

Modes for carrying out the present invention are explained below by reference to embodiments of the present invention shown in the attached drawings.

Embodiment 1

As shown in FIG. 1 to FIG. 4, a variable compression ratio engine E, which is one example of a variable stroke characteristic engine in which the position of top dead center or bottom dead center of a piston can be varied due to it being equipped with a plurality of links, is equipped with an engine block 13 in which a cylinder block 11 and a crankcase 12 are joined together, a cylinder head 14 and a head cover 15 are joined to an upper part of the cylinder block 11, and an oil pan 16 is joined to a lower part of the crankcase 12. A main journal 17a of a crankshaft 17 is rotatably supported on mating faces of the cylinder block 11 and the crankcase 12, and a middle section of a substantially triangular lower link 18 is swingably and pivotably supported on a pin journal 17b, which is eccentric to the main journal 17a.

A piston 21 is slidably fitted into a cylinder sleeve 20 provided in the cylinder block 11, the upper end of an upper link 22 (connecting rod) is pivotably supported on the piston 21 via a piston pin 23, and the lower end of the upper link 22 is pivotably supported on one end part of the lower link 18 via a first pin 24.

A crank-shaped control shaft 25 has its main journal 25a swingably and pivotably supported on a lower face of the crankcase 12 that is laterally eccentric to the position of the crankshaft 17 via a cap 27 secured to the crankcase 12 via bolts 26 and 26. A control link 28 includes a main body portion 28a and a cap 28b secured to the lower end thereof via bolts 29 and 29, the upper end of the main body portion 28a is pivotably supported on the other end part of the lower link 18 via a second pin 30, and a pin journal 25b of the control shaft 25 is pivotably supported between the lower end of the main body portion 28a and the cap 28b. The control shaft 25 is swung over a predetermined angle range by a hydraulic actuator 31 provided at one end thereof.

An intake port 32 and an exhaust port 33 open in a combustion chamber 14a formed on a lower face of the cylinder head 14, and an intake valve 34 for opening and closing the intake port 32 and an exhaust valve 35 for opening and closing the exhaust port 33 are provided in the cylinder head 14. The intake valve 34 is operated so as to open and close by an intake camshaft 36 via an intake rocker arm 37, and the exhaust valve 35 is operated so as to open and close by an exhaust camshaft 38 via an exhaust rocker arm 39.

A secondary balancer system 43 is housed between an upper balancer housing 40 fixedly joined to the crankcase 12 beneath the crankshaft 17 and a lower balancer housing 42 connected to the lower face of the upper balancer housing 40 via bolts 41. The secondary balancer system 43 includes a first balancer shaft 44 integrally having a first balancer weight 44a and a second balancer shaft 45 integrally having a second balancer weight 45a; the first balancer shaft 44 is driven by a second gear 47 meshing with a first gear 46 provided on the crankshaft 17, and the second balancer shaft 45 is driven by a fourth gear 49 meshing with a third gear 48 provided on the first balancer shaft 44. Since the number of teeth of the first gear 46 is set to be twice the number of teeth of the second gear 47, and the numbers of teeth of the third gear 48 and the fourth gear 49 are set to be identical, the first and second balancer shafts 44 and 45 rotate in directions opposite to each other at a rotational speed twice that of the crankshaft 17, thus suppressing secondary vibration of the engine E.

The secondary balancer system 43 may transmit a driving force from the crankshaft 17 to the first and second balancer shafts 44 and 45 using a chain or a timing belt.

A straight line L2 joining the centers of the first and second balancer shafts 44 and 45 is perpendicular to a cylinder axis L1, which is positioned vertically, the straight line L2 therefore extending horizontally. The phase of the first balancer weight 44a of the first balancer shaft 44 and the phase of the second balancer weight 45a of the second balancer shaft 45 are set so that, when the second balancer weight 45a faces vertically upward, the phase of first balancer weight 44a is displaced in an anticlockwise direction from the vertically upward position.

The operation of the first embodiment of the present invention having the above-mentioned arrangement is now explained.

Figure 5:
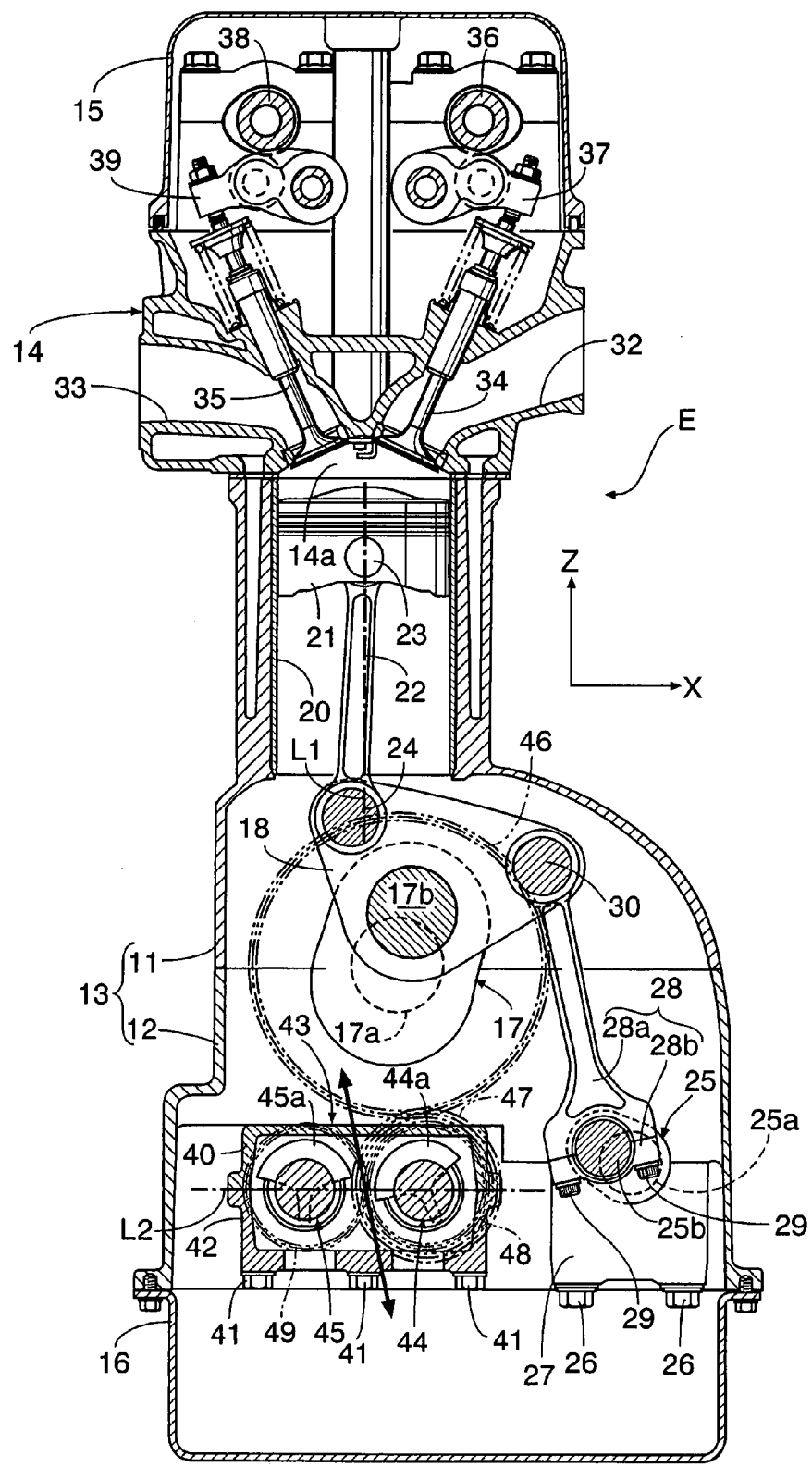
FIG. 5 is a vertical sectional view of the variable compression ratio engine (low compression ratio state) (first embodiment).

The actuator 31 is driven according to the running state of the engine E, and the control shaft 25 connected to the actuator 31 rotates to any position between the position shown in FIG. 1 and the position shown in FIG. 5. At the position shown in FIG. 1, since the pin journal 25b is positioned below the main journal 25a of the control shaft 25, the control link 28 is pulled down, the lower link 18 swings in a clockwise direction with the pin journal 17b of the crankshaft 17 as the center, the upper link 22 is pushed up, and the position of the piston 21 rises, thus putting the engine E into a high compression ratio state.

In contrast, at the position shown in FIG. 5, since the pin journal 25b is positioned above the main journal 25a of the control shaft 25, the control link 28 is pushed up, the lower link 18 swings in an anticlockwise direction with the pin journal 17b of the crankshaft 17 as the center, the upper link 22 is pulled down, and the position of the piston 21 falls, thus putting the engine E into a low compression ratio state.

In this way, as a result of swinging of the control shaft 25, the control link 28 moves vertically, conditions for restraining the movement of the lower link 18 change, the stroke characteristics, such as the top dead center position of the piston 21, change, and the compression ratio of the engine E is thereby freely controlled.

Figure 6:
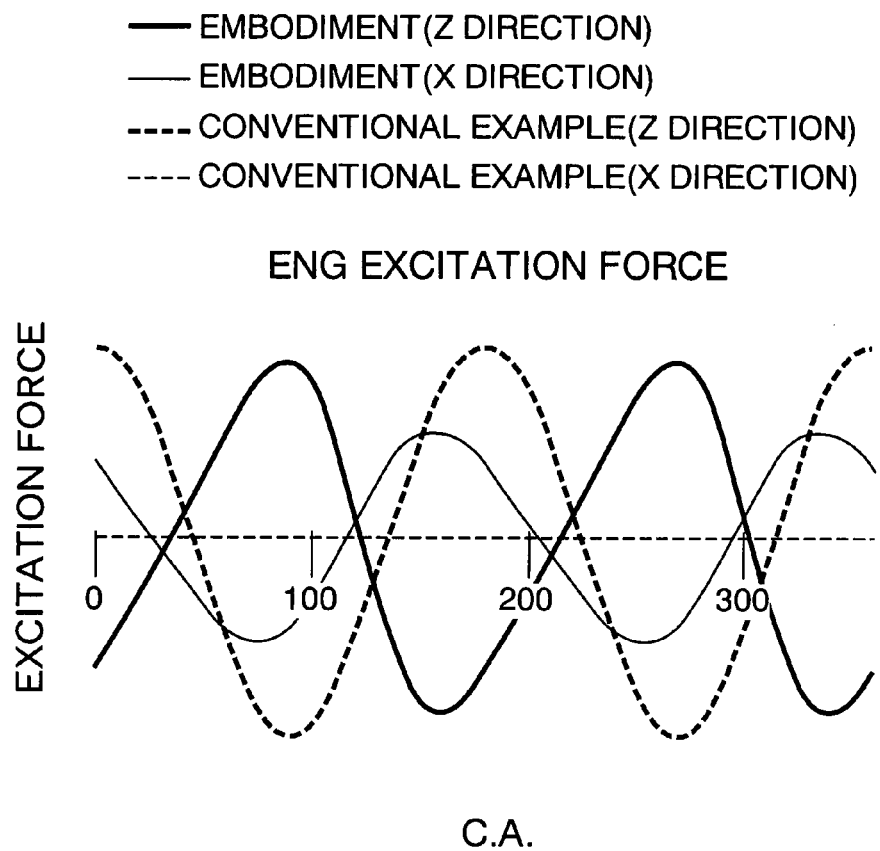
FIG. 6 is a graph showing changes in engine vibration with respect to crank angle (first embodiment).

FIG. 6 shows the characteristics of change in excitation force of secondary vibration of the engine with respect to crank angle. That is, in a conventional normal engine in which a piston and a crankshaft disposed on a cylinder axis are connected via a connecting rod, the excitation force (shown by thick broken line) in the cylinder axis direction (Z direction) is sinusoidal, and the excitation force (shown by fine broken line) in a direction perpendicular to the cylinder axis and the crankshaft (X direction) is 0. On the other hand, since the engine E of this embodiment has the lower link 18, the upper link 22, and the control link 28 disposed asymmetrically relative to the cylinder axis L1, the excitation force (shown by thick solid line) in the cylinder axis L1 direction (Z direction) and the excitation force (shown by fine solid line) in a direction perpendicular to the cylinder axis L1 and the crankshaft 17 (X direction) are generated at the same time.

Figure 7:
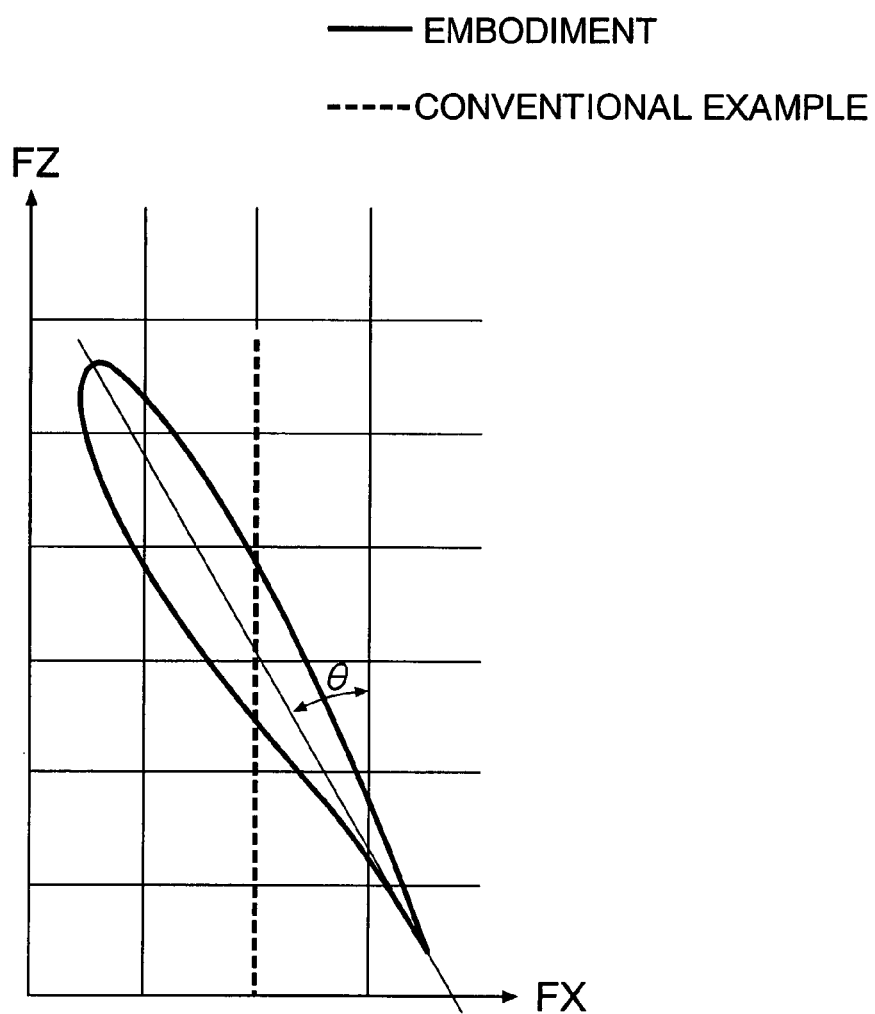
FIG. 7 is a graph showing the direction of engine vibration (first embodiment).

FIG. 7 shows waveforms of excitation forces FX and FZ of the secondary vibration in the X-Z plane (plane perpendicular to the crankshaft 17), and it is found that for a conventional normal engine, shown by the broken line, only the excitation force FZ in the Z direction is generated, whereas in the engine E of the present embodiment, shown by the solid line, the excitation force FZ in the Z direction and the excitation force FX in the X direction are generated at the same time, and the direction of the principal excitation force is inclined toward the X direction just by an angle θ relative to the Z direction.

In order to counterbalance effectively the vibration inclined just by the angle θ, as shown by the arrow in FIG. 1, the direction of the excitation force generated by the secondary balancer system 43 may be inclined just by the angle θ relative to the cylinder axis L1, and in this embodiment this effect is achieved by making the phases of the first and second balancer weights 44a and 45a of the first and second balancer shafts 44 and 45 asymmetric.

Figure 8A:
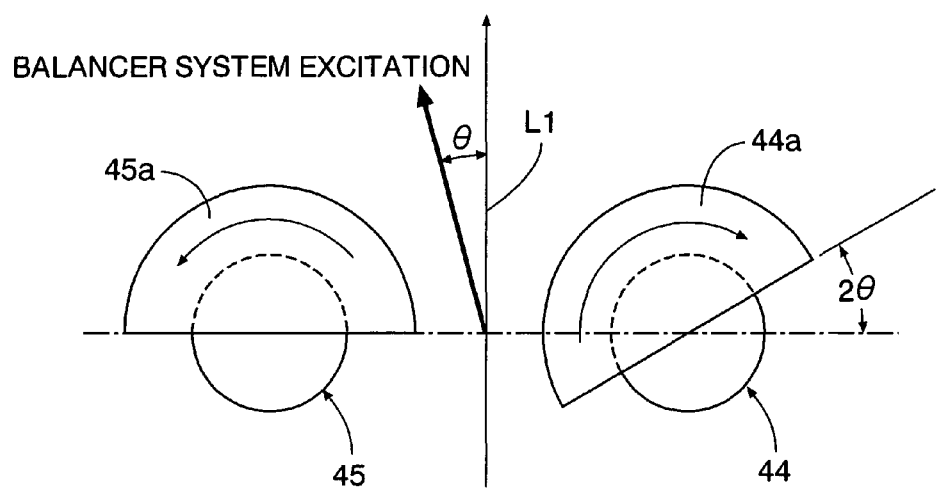
FIG. 8A is a graph showing the relationship between phases of balancer weights and the direction of an excitation force (first embodiment).
Figure 8B:
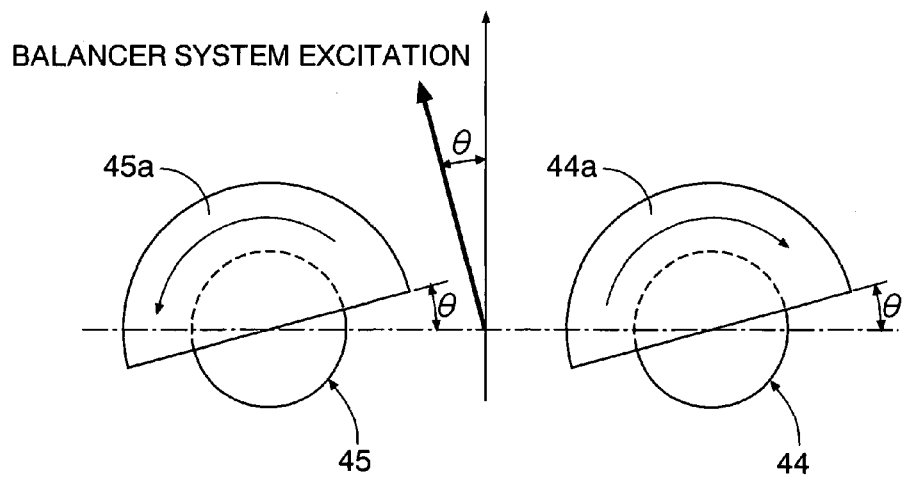
FIG. 8B is a graph showing the relationship between phases of balancer weights and the direction of an excitation force (first embodiment).

As shown in FIG. 8B, when the phases of the first and second balancer weights 44a and 45a, which rotate in directions opposite to each other, are the same, a maximum excitation force is generated in the direction of the first and second balancer weights 44a and 45a. However, in the present embodiment, as shown in FIG. 8A, when the phase of the second balancer weight 45a is aligned with respect to the cylinder axis L1, biasing the phase of the first balancer weight 44a just by 2θ allows the direction in which a maximum excitation force is generated to be inclined just by θ relative to the cylinder axis L1. It is therefore possible to freely set the direction of the excitation force generated by the secondary balancer system 43 merely by changing the value of θ.

As hereinbefore described, even if the direction of secondary vibration generated accompanying running of the multi-link variable compression ratio engine E is inclined relative to the cylinder axis L1, by inclining the direction of the excitation force generated by the secondary balancer system 43 so that it coincides with the direction of the secondary vibration, the secondary vibration can be eliminated effectively.

Figure 9:
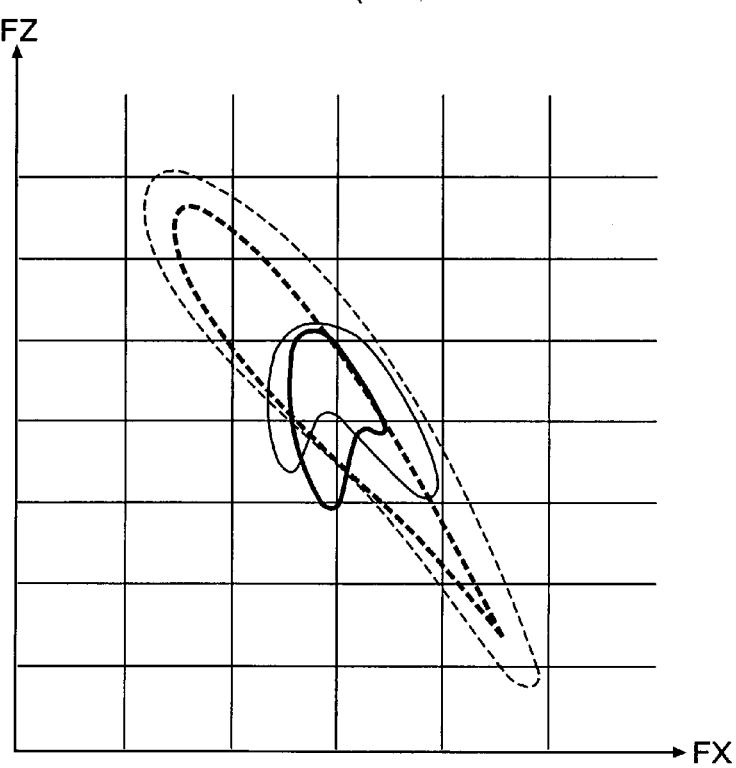
FIG. 9 is a graph showing the effect of the embodiment (first embodiment).

The two broken lines in FIG. 9 show the vibration characteristics of a comparative example in which the secondary balancer system 43 is removed from the engine E of the present embodiment, and it is found that both when there is a low compression ratio and when there is a high compression ratio the excitation forces in the Z direction and the X direction are large. On the other hand, the two solid lines show the vibration characteristics of the engine E of the present embodiment, and both when there is a low compression ratio and when there is a high compression ratio the excitation forces in the Z direction and the X direction are greatly reduced.

Embodiment 2

A second embodiment of the present invention is now explained by reference to FIG. 10.

Figure 10:
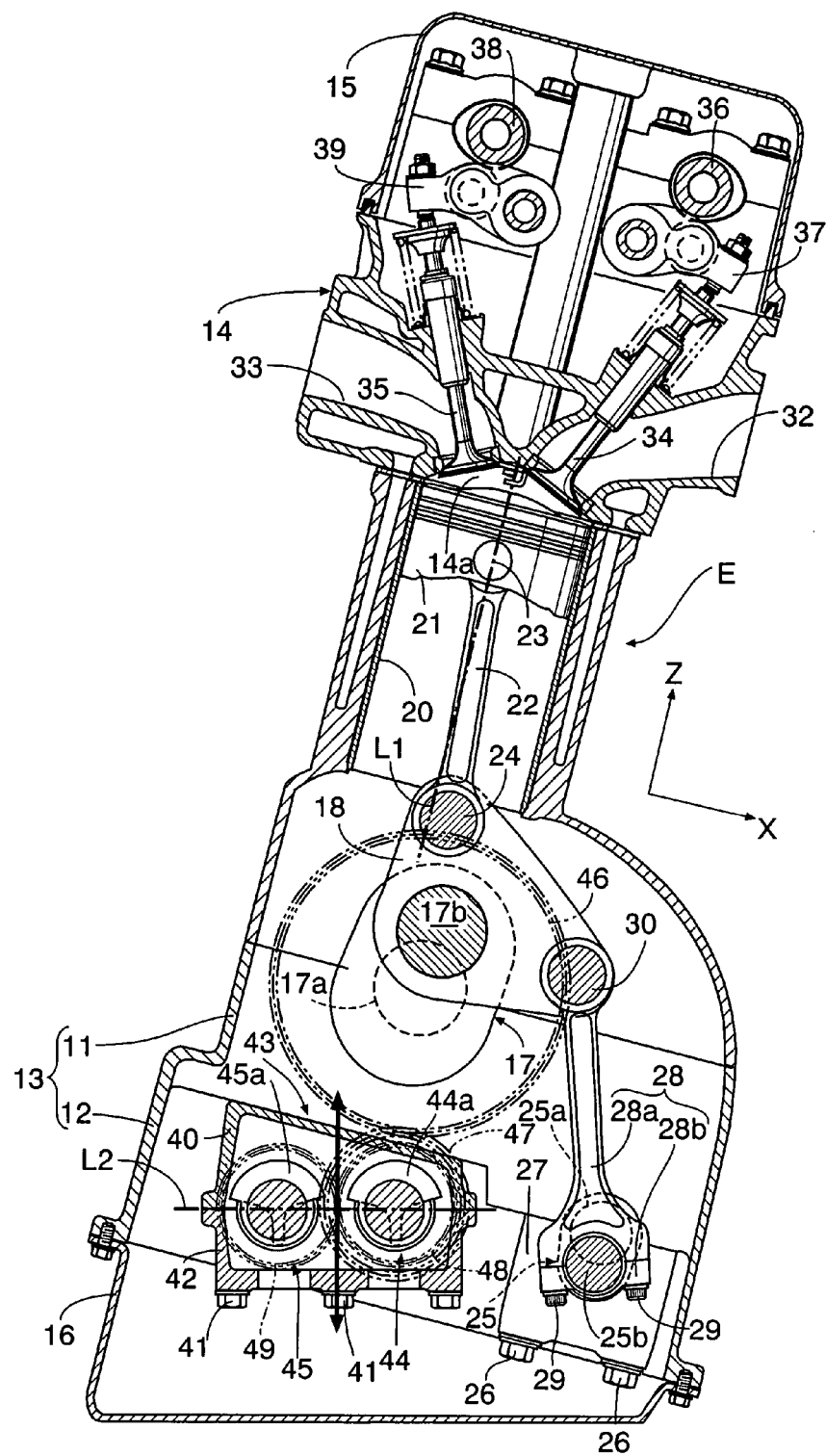
FIG. 10 is a vertical sectional view of a variable compression ratio engine related to a second embodiment of the present invention (high compression ratio state) (second embodiment).

The engine E of the first embodiment is disposed so that the cylinder axis L1 is vertical, whereas an engine E of the second embodiment shown in FIG. 10 is disposed so that a cylinder axis L1 is inclined toward an intake side just by an angle θ. However, a straight line L2 joining the centers of first and second balancer shafts 44 and 45 of a secondary balancer system 43 extends horizontally parallel to a base of an oil pan 16. The phases of first and second balancer weights 44a and 45a are set so that they are simultaneously vertically upward or vertically downward, and the direction (shown by arrow) of the excitation force generated by the secondary balancer system 43 is therefore a vertical direction.

Since the cylinder axis L1 of this engine E is inclined just by the angle θ relative to the vertical direction, the direction of an excitation force generated by the secondary balancer system 43 is inclined just by the angle θ relative to the cylinder axis L1, and vibration of the engine E can be eliminated effectively as in the first embodiment. Moreover, in accordance with this second embodiment, since the straight line L2 joining the centers of the first and second balancer shafts 44 and 45 is inclined relative to a direction (X direction) perpendicular to the cylinder axis L1, the width of the engine block 13 in the X direction can be made smaller compared with the first embodiment, and the distance between the secondary balancer system 43 and the oil pan 16 can also be shortened. However, in terms of making the dimension of the engine E in the cylinder axis L1 direction (Z direction) compact, the first embodiment is advantageous.

Embodiment 3

A third embodiment of the present invention is now explained by reference to FIG. 11.

Figure 11:
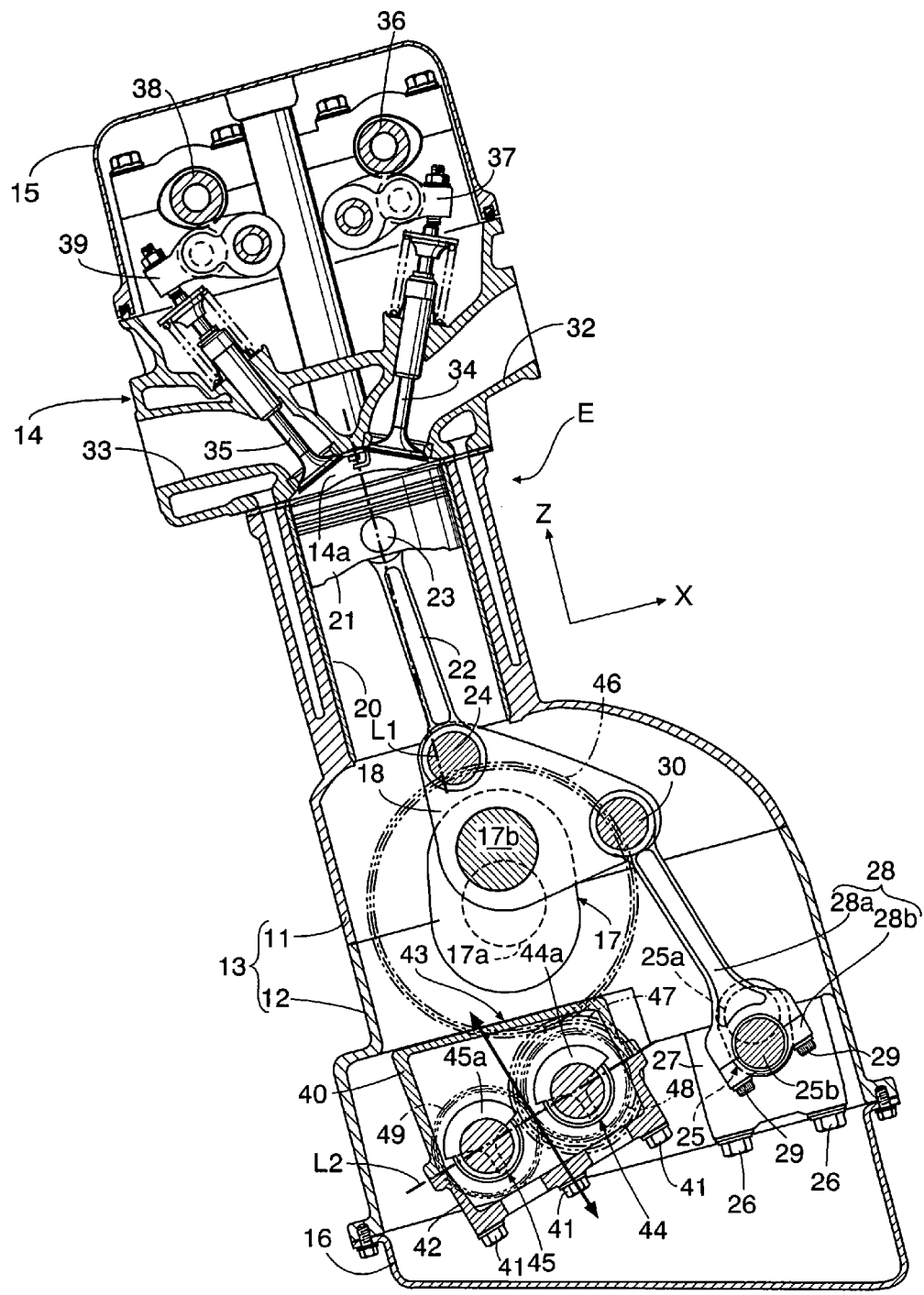
FIG. 11 is a vertical sectional view of a variable compression ratio engine related to a third embodiment (high compression ratio state) (third embodiment).

The engine E of the second embodiment shown in FIG. 10 is disposed so that the cylinder axis L1 is inclined toward the intake side just by the angle θ, whereas an engine E of the third embodiment shown in FIG. 11 is disposed so that a cylinder axis L1 is inclined toward an exhaust side. Since the positional relationship of a secondary balancer system 43 relative to the cylinder axis L1 is the same as in the second embodiment, a straight line L2 joining the centers of first and second balancer shafts 44 and 45 is more greatly inclined relative to the vertical direction.

In accordance with this third embodiment, not only can the vibration of the engine E be eliminated effectively as in the first and second embodiments, but it is also possible to further reduce the width of an engine block 13 in a direction (X direction) perpendicular to the cylinder axis L1 compared with the second embodiment; however, the dimension in the cylinder axis L1 direction (Z direction) increases slightly.

Embodiment 4

A fourth embodiment is now explained by reference to FIG. 12 to FIG. 14C. The arrangement of an engine E of the fourth embodiment is basically the same as that of the first embodiment.

Figure 13:
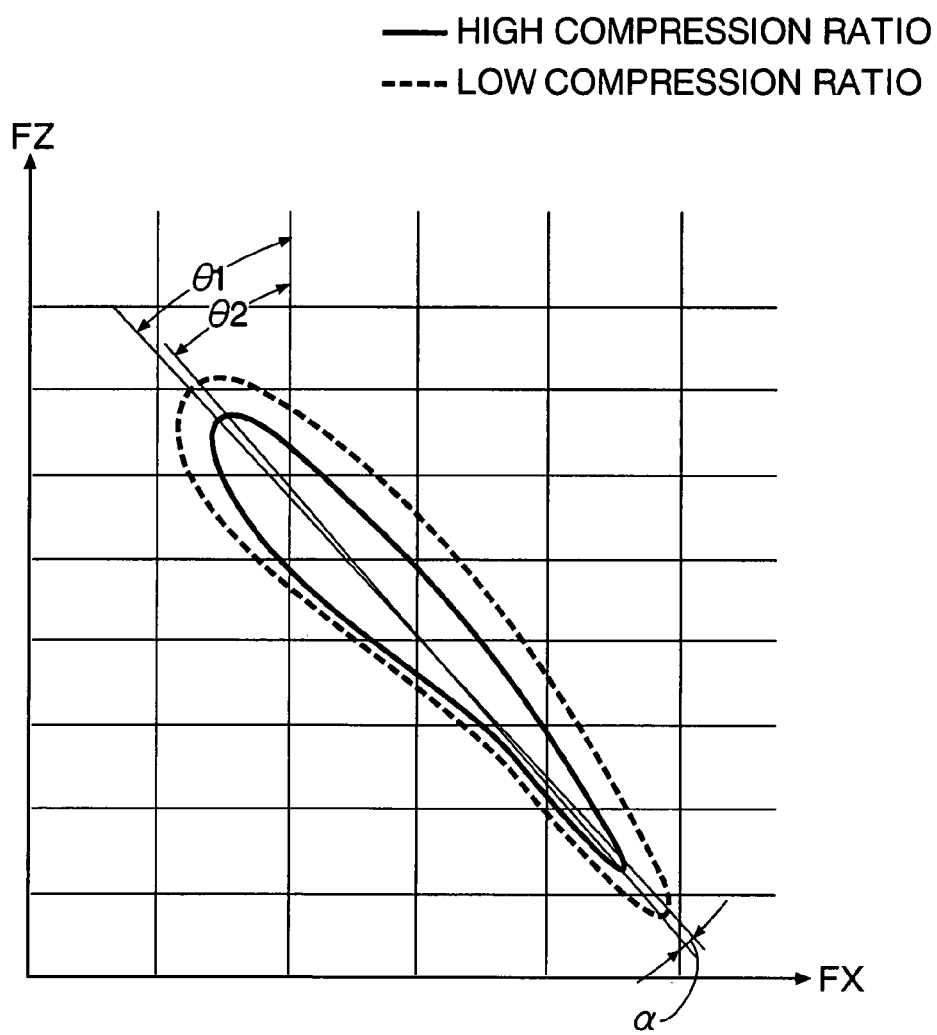
FIG. 13 is a graph showing the direction of secondary vibration of an engine (fourth embodiment).

FIG. 13 shows waveforms of secondary vibrations FX and FZ in an X-Z plane (plane perpendicular to a crankshaft 17), and it is found that the secondary vibration FZ in the Z direction and the secondary vibration FX in the X direction are generated at the same time, and the direction of principal secondary vibration is inclined toward the X direction just by an angle θ1 or θ2 relative to the Z direction. The direction θ1 of secondary vibration when there is a high compression ratio is displaced from the direction θ2 of secondary vibration when there is a low compression ratio just by an angle α.

Figure 12:
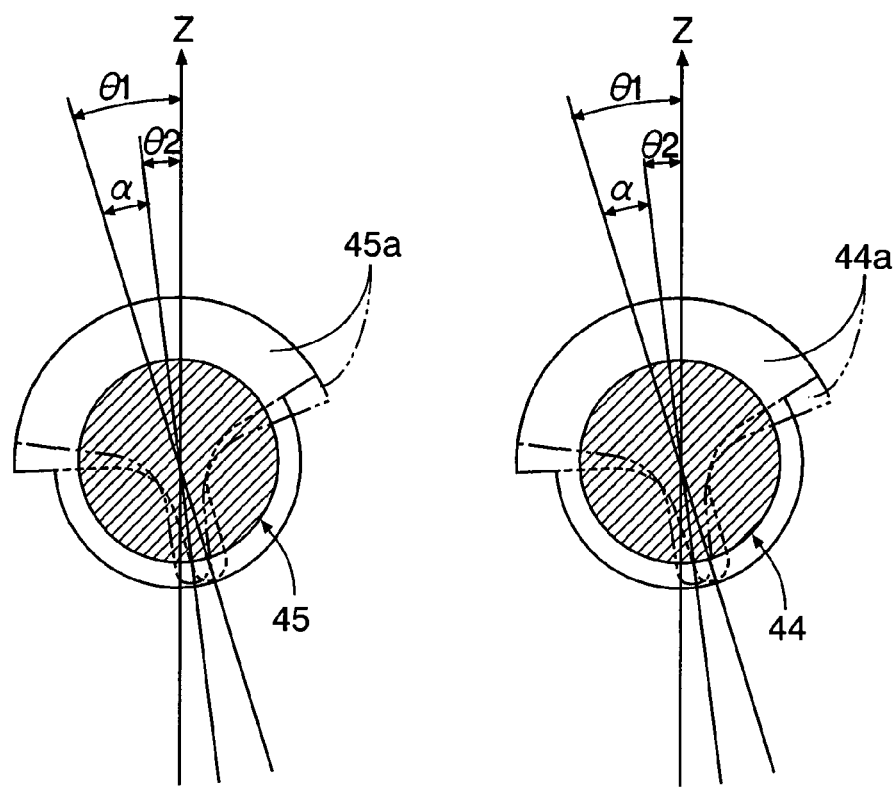
FIG. 12 is a view showing the relationship between phases of balancer weights and the direction of an excitation force (fourth embodiment).

As shown in FIG. 12, in order to counterbalance effectively the secondary vibration, which is inclined relative to the Z direction, the direction of an excitation force generated by a secondary balancer system 43 may be inclined just by an angle θ relative to a cylinder axis L1. That is, when the phases of first and second balancer weights 44a and 45a, which rotate in directions opposite to each other, are the same, a maximum excitation force is generated in the direction of the first and second balancer weights 44a and 45a, and biasing the phases of the first and second balancer weights 44a and 45a at that time just by θ relative to the cylinder axis L1 allows the direction of the maximum excitation force to be inclined just by θ relative to the cylinder axis L1. It is therefore possible to freely set the direction of the excitation force generated by the secondary balancer system 43 merely by changing the value of θ.

However, since the angle θ1 when there is a high compression ratio and the angle θ2 when there is a low compression ratio are different from each other, there is the problem that, if the angle θ1 for suppressing effectively the secondary vibration when there is a high compression ratio is employed, the secondary vibration when there is a low compression ratio cannot be suppressed effectively, and in contrast thereto if the angle θ2 for suppressing effectively the secondary vibration when there is a low compression ratio is employed, the secondary vibration when there is a high compression ratio cannot be suppressed effectively. In the present embodiment, the direction in which the first and second balancer weights 44a and 45a generate a maximum excitation force is set so as to be a direction θ between the direction θ1 of the secondary vibration when there is a high compression ratio and the direction θ2 of the secondary vibration when there is a low compression ratio. Specifically, the direction θ in which the first and second balancer weights 44a and 45a generate a maximum excitation force is set so that the amplitude of the secondary vibration when there is a high compression ratio and the amplitude of the secondary vibration when there is a low compression ratio substantially coincide with each other. This enables the secondary vibration both when there is a high compression ratio and when there is a low compression ratio to be suppressed effectively.

Even if the compression ratio of the engine E is changed, since the change in direction of the secondary vibration of the engine E can be minimized by the secondary balancer system 43, an occupant rarely experiences any disagreeable sensation due to a change in the running state of the engine E.

Figure 14A:
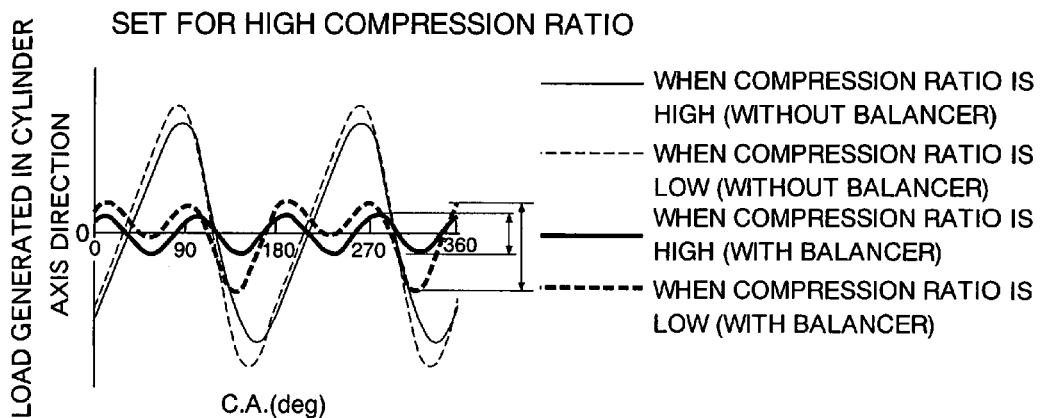
FIG. 14A is a graph showing the effect of a secondary balancer system (fourth embodiment).
Figure 14B:
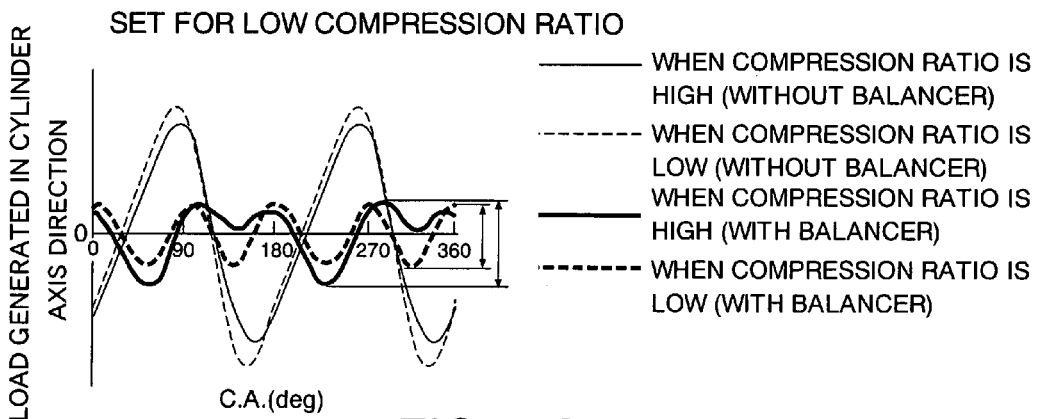
FIG. 14B is a graph showing the effect of the secondary balancer system (fourth embodiment).
Figure 14C:
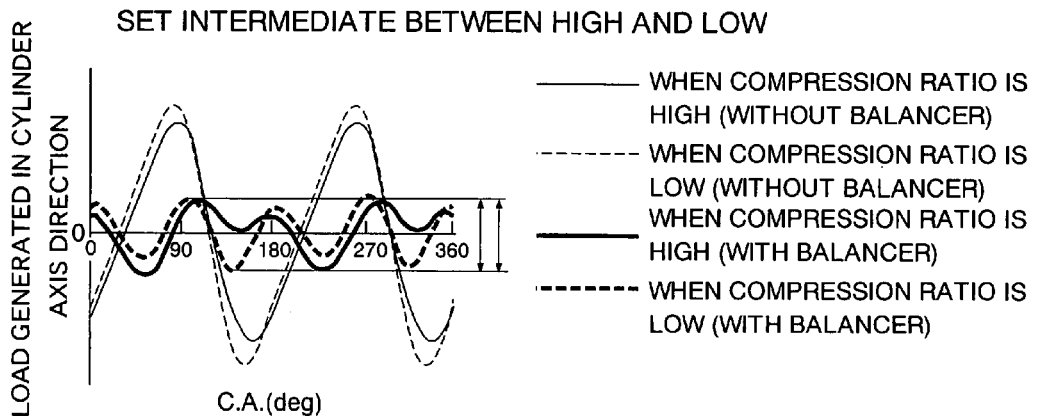
FIG. 14C is a graph showing the effect of the secondary balancer system (fourth embodiment).

The fine solid lines and the fine broken lines in FIG. 14 to FIG. 14C are waveforms of secondary vibration FZ when there is a high compression ratio and when there is a low compression ratio of an engine E having no secondary balancer system 43, and the thick solid lines and the thick broken lines are waveforms of secondary vibration FZ when there is a high compression ratio and when there is a low compression ratio of the engine E having the secondary balancer system 43. In all cases, providing the secondary balancer system 43 greatly reduces the secondary vibration FZ.

FIG. 14A to FIG. 14C are different in terms of the direction in which the first and second balancer weights 44a and 45a generate a maximum excitation force. In FIG. 14A, they are set so that the secondary vibration (thick solid line) when there is a high compression ratio is most effectively suppressed, and although the secondary vibration when there is a high compression ratio is sufficiently reduced, considerable secondary vibration (thick broken line) remains when there is a low compression ratio. In FIG. 14B, they are set so that the secondary vibration (thick broken line) when there is a low compression ratio is most effectively suppressed, and although the secondary vibration when there is a low compression ratio is sufficiently reduced, considerable secondary vibration (thick solid line) remains when there is a high compression ratio. In FIG. 14C, they are set (setting of the present embodiment) so as to be between the setting when there is a high compression ratio and the setting when there is a low compression ratio, and the amplitude of the secondary vibration (thick solid line) when there is a high compression ratio and the amplitude of the secondary vibration (thick broken line) when there is a low compression ratio are reduced to the same magnitude.

Embodiment 5

A fifth embodiment of the present invention is now explained by reference to FIG. 15 to FIG. 17. The arrangement of an engine E of the fifth embodiment is basically the same as that of the first embodiment.

Figure 15:
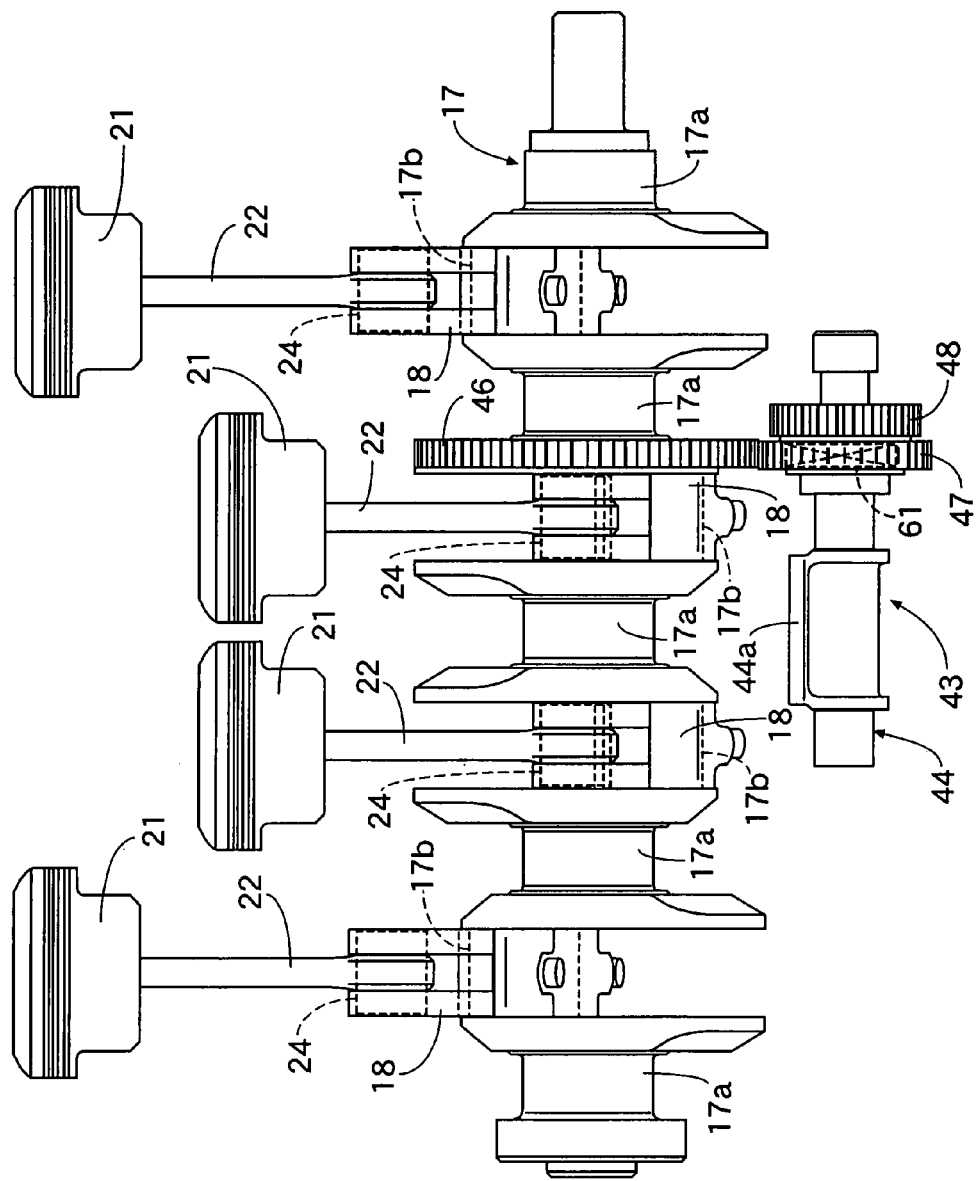
FIG. 15 is a view corresponding to FIG. 2 above (fifth embodiment).
Figure 16:
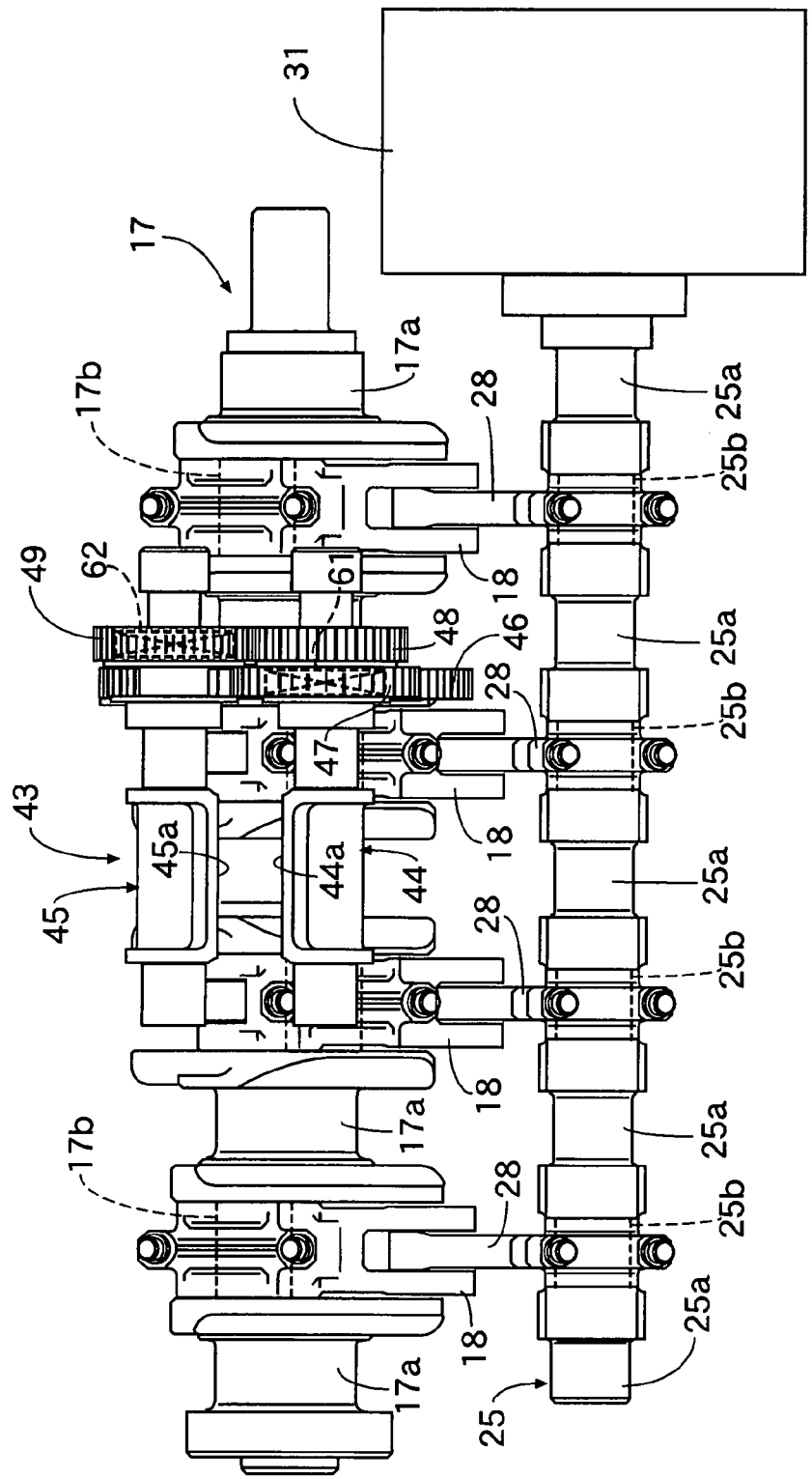
FIG. 16 is a view corresponding to FIG. 4 above (fifth embodiment).

As is clear from FIG. 15 and FIG. 16, a first variable phase mechanism 61 is disposed between a first balancer shaft 44 and a second gear 47 supported on the outer periphery thereof, and a second variable phase mechanism 62 is disposed between a second balancer shaft 45 and a fourth gear 49 supported on the outer periphery thereof. The first variable phase mechanism 61 freely changes the phase of the first balancer shaft 44 relative to the phase of the second gear 47, that is, the phase of the first balancer shaft 44 relative to the phase of a crankshaft 17. Furthermore, the second variable phase mechanism 62 freely changes the phase of the second balancer shaft 45 relative to the phase of the fourth gear 49, that is, the phase of the second balancer shaft 46 relative to the phase of the first balancer shaft 44. Since the structure of the first variable phase mechanism 61 is identical to that of the second variable phase mechanism 62, the structure of the first variable phase mechanism 61 is explained as being representative thereof.

Figure 17:
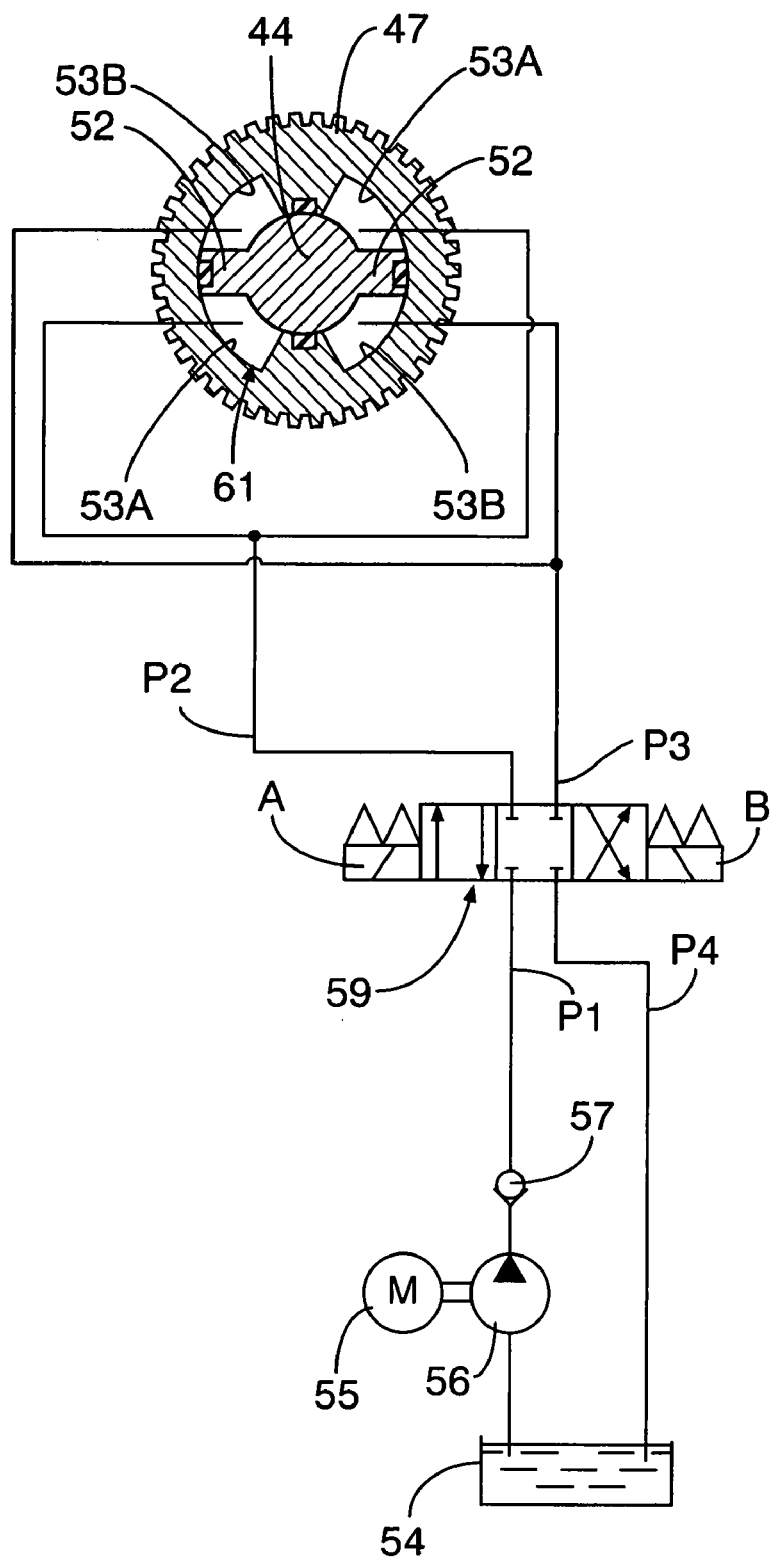
FIG. 17 is a diagram of a hydraulic circuit of a first variable phase mechanism (fifth embodiment).

As shown in FIG. 17, the first variable phase mechanism 61 includes fan-shaped oil chambers 53A and 53A; 53B and 53B swingably housing a pair of vanes 52 and 52 extending on opposite sides of the first balancer shaft 44, a direction switching valve 59 is disposed in a middle section of first oil paths P1 and P2 and second oil paths P3 and P4 providing a connection between an oil tank 54 and the oil chambers 53A and 53A; 53B and 53B, and a check valve 57 and an oil pump 56 driven by a motor 55 are disposed in the first oil path P1. Therefore, when a solenoid B is turned ON so as to switch the direction switching valve 59 toward the left, the vanes 52 and 52 are pushed by hydraulic pressure generated by the oil pump 56, and the first balancer shaft 44 rotates in an anticlockwise direction; on the other hand when a solenoid A is turned ON so as to switch the direction switching valve 59 toward the right, the vanes 52 and 52 are pushed by hydraulic pressure generated by the oil pump 56, and the first balancer shaft 44 rotates in a clockwise direction.

In this way, selectively turning the solenoids A and B of the direction switching valve 590N enables the phase of the first balancer shaft 44 relative to the phase of the crankshaft 17 to be freely changed, and in the same manner the phase of the second balancer shaft 46 relative to the phase of the first balancer shaft 44 can be freely changed by the second variable phase mechanism 62.

The operation of the fifth embodiment of the present invention having the above-mentioned arrangement is now explained.

As explained above with respect to FIG. 12 and FIG. 13 in the fourth embodiment, the optimum angle θ1 when there is a high compression ratio does not coincide with the optimum angle θ2 when there is a low compression ratio, and there is the problem that, if the angle θ1 for suppressing effectively secondary vibration when there is a high compression ratio is employed, the secondary vibration when there is a low compression ratio cannot be suppressed effectively, and in contrast thereto if the angle θ2 for suppressing effectively secondary vibration when there is a low compression ratio is employed, the secondary vibration when there is a high compression ratio cannot be suppressed effectively. In the present embodiment, by controlling the first and second variable phase mechanisms 61 and 62 so that a direction in which the first and second balancer weights 44a and 45a generate a maximum excitation force is made to coincide with a direction of the secondary vibration generated according to the compression ratio at that time, secondary vibration of any level at both compression ratios can be reduced effectively.

The fine solid lines and the fine broken lines in FIG. 14A and FIG. 14B are waveforms of secondary vibration FZ when there is a high compression ratio and when there is a low compression ratio of an engine E having no secondary balancer system 43, and the thick solid lines and the thick broken lines are waveforms of the secondary vibration FZ when there is a high compression ratio and when there is a low compression ratio of the engine E having the secondary balancer system 43. In either case, providing the secondary balancer system 43 greatly reduces the secondary vibration FZ.

FIG. 14A and FIG. 14B are different in terms of the direction in which the first and second balancer weights 44a and 45a generate a maximum excitation force. In FIG. 14A, the phases of the first and second balancer shafts 44 and 45 are set so that the secondary vibration (thick solid line) when there is a high compression ratio is most effectively suppressed, and the secondary vibration when there is a high compression ratio is sufficiently reduced. It is found that, when the phases of the first and second balancer shafts 44 and 45 are set in this way, considerable secondary vibration (thick broken line) remains when there is a low compression ratio.

In FIG. 14B, the phases of the first and second balancer shafts 44 and 45 are set so that the secondary vibration (thick broken line) when there is a low compression ratio is most effectively suppressed, and the secondary vibration when there is a low compression ratio is sufficiently reduced. It is found that, when the phases of the first and second balancer shafts 44 and 45 are set in this way, considerable secondary vibration (thick solid line) remains when there is a high compression ratio.

In this way, since the timing at which the secondary vibration becomes the largest with respect to the phase of the crankshaft 17 differs between when there is a high compression ratio and when there is a low compression ratio, the phases of the first and second balancer shafts 44 and 45 are controlled using the first variable phase mechanism 61 so that the phase of the maximum excitation force of the secondary balancer system 43 coincides with the timing at which the secondary vibration becomes the largest.

A case when there is a high compression ratio and a case when there is a low compression ratio have been explained here, but with regard to a state in which the compression ratio is between the two cases, the phases of the first and second balancer shafts 44 and 45 relative to the crankshaft 17 and the direction of the maximum excitation force may be changed in the same manner using the first and second variable phase mechanisms 61 and 62.

Embodiment 6

A sixth embodiment of the present invention is now explained by reference to FIG. 18 to FIG. 24.

Figure 18:
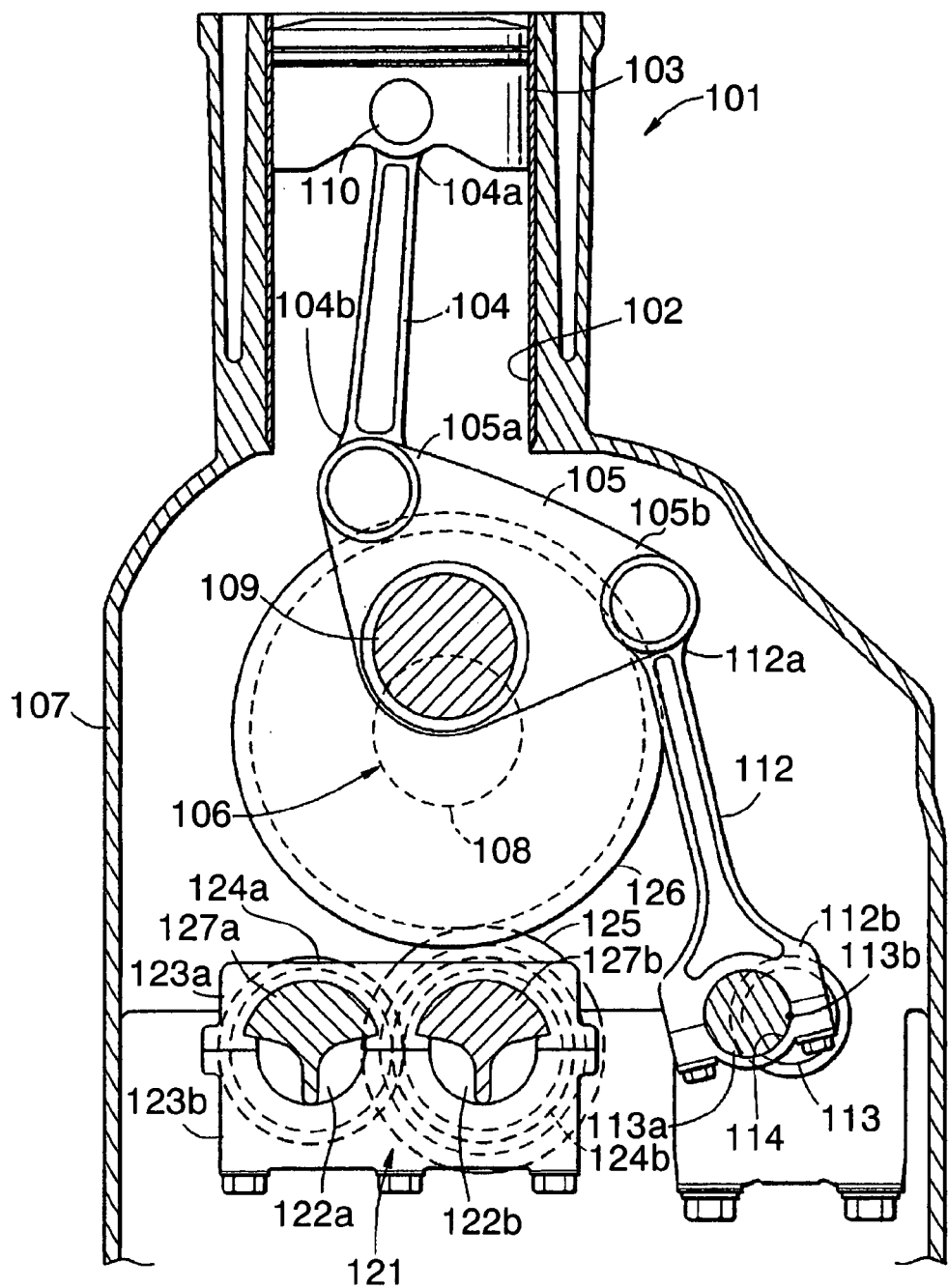
FIG. 18 is a vertical sectional view showing a piston top dead center position in a high compression ratio state of an engine (sixth embodiment).

FIG. 18 is a schematic view of the arrangement of a variable stroke characteristic engine to which the present invention has been applied. A piston 103 slidably mated with a cylinder 102 of this engine 101 is connected to a crankshaft 106 via two links, that is, a first link 104 and a second link 105.

The crankshaft 106 basically has the same arrangement as that of a normal fixed stroke engine, and supports a middle section of the second link 105, which swings in a seesaw manner, by means of a crankpin 109 eccentric to a crank journal 108 (rotational center of the crankshaft) supported in the crankcase 107. The first link 104 has a little end portion 104a connected to a piston pin 110 and a big end portion 104b connected to one end 105a of the second link 105.

The other end 105b of the second link 105 is connected via a pin to a little end portion 112a of a third link 112, which has the same arrangement as that of a connecting rod providing a connection between a piston and a crankshaft in a normal engine. A big end portion 112b of the third link 112 is connected via a split bearing 114 to an eccentric portion 113a of an eccentric shaft 113 pivotably supported in the crankcase 107.

Figure 22:
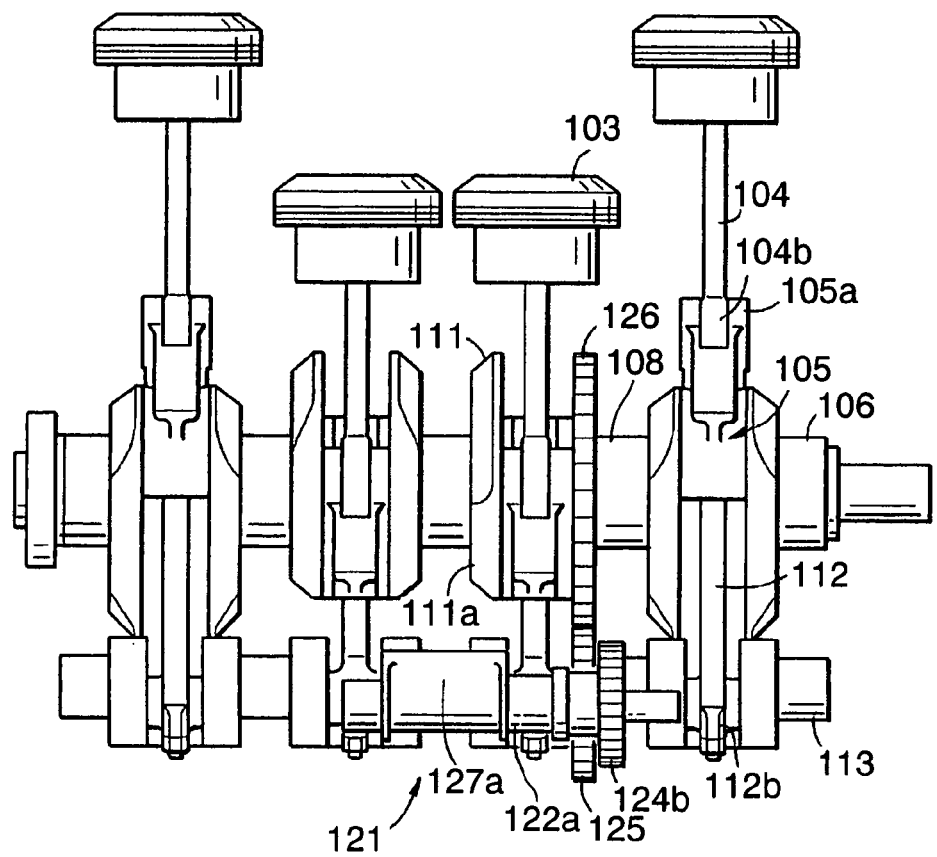
FIG. 22 is a right side view of an engine internal mechanism (sixth embodiment).
Figure 23:
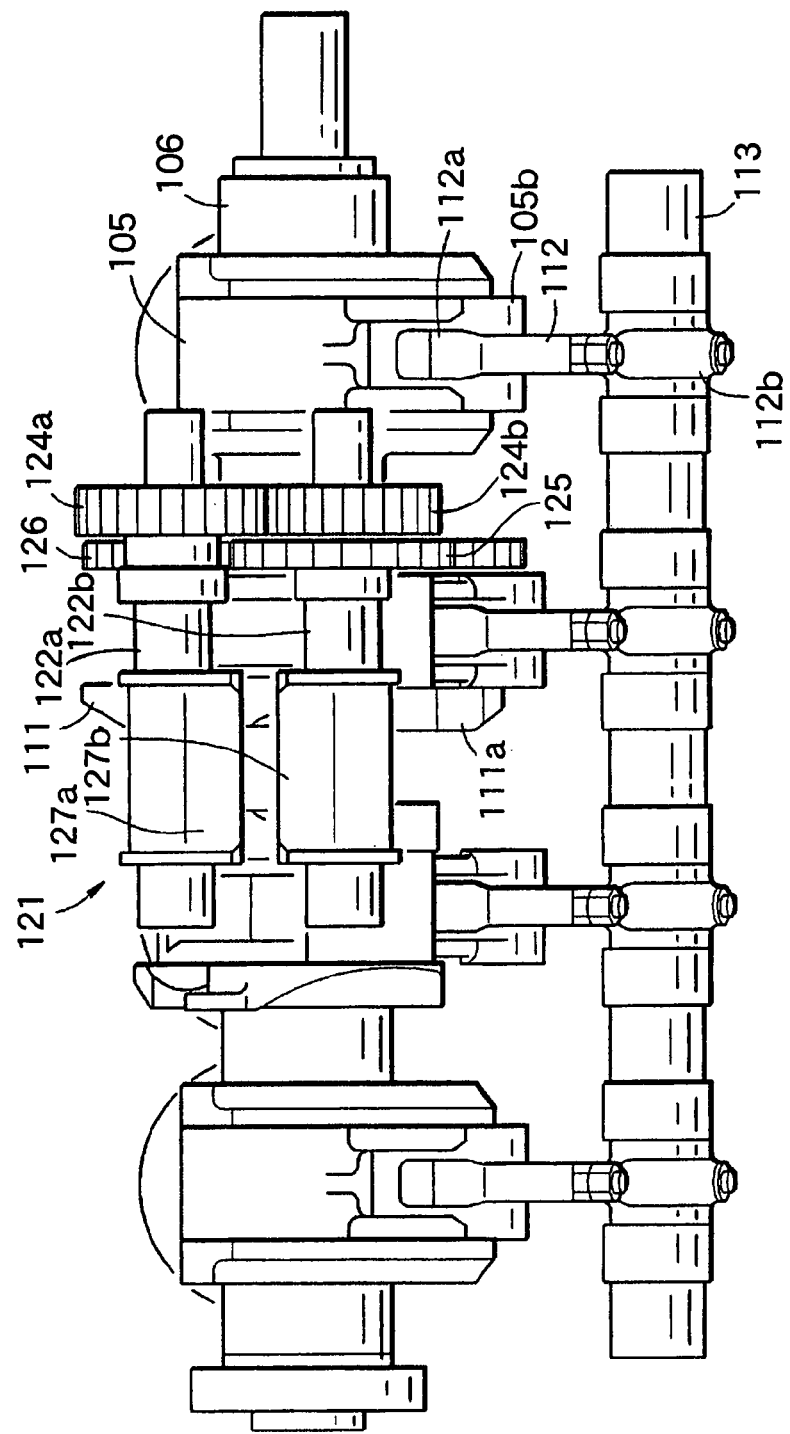
FIG. 23 is a bottom view of the engine internal mechanism (sixth embodiment).

More specifically, as shown in FIG. 22, the big end portion 104b of the first link 104 is held from opposite sides in the axial direction of the crankshaft 106 by a bifurcated part formed at said one end 105a of the second link 105. As shown in FIG. 23, the little end portion 112a of the third link 112 is held from opposite sides in the axial direction of the crankshaft 106 by a bifurcated part formed at said other end 105b of the second link 105. The first link 104 and the third link 112 therefore move on substantially identical imaginary planes perpendicular to the axis of the crankshaft 106.

The eccentric shaft 113 has its pivot angle controlled continuously according to the running state of the engine 101 by means of a variable stroke characteristic control actuator (not illustrated) provided at an end of the shaft projecting outwardly from the crankcase 107, and the shaft 113 can be held at any angle.

Figure 19:
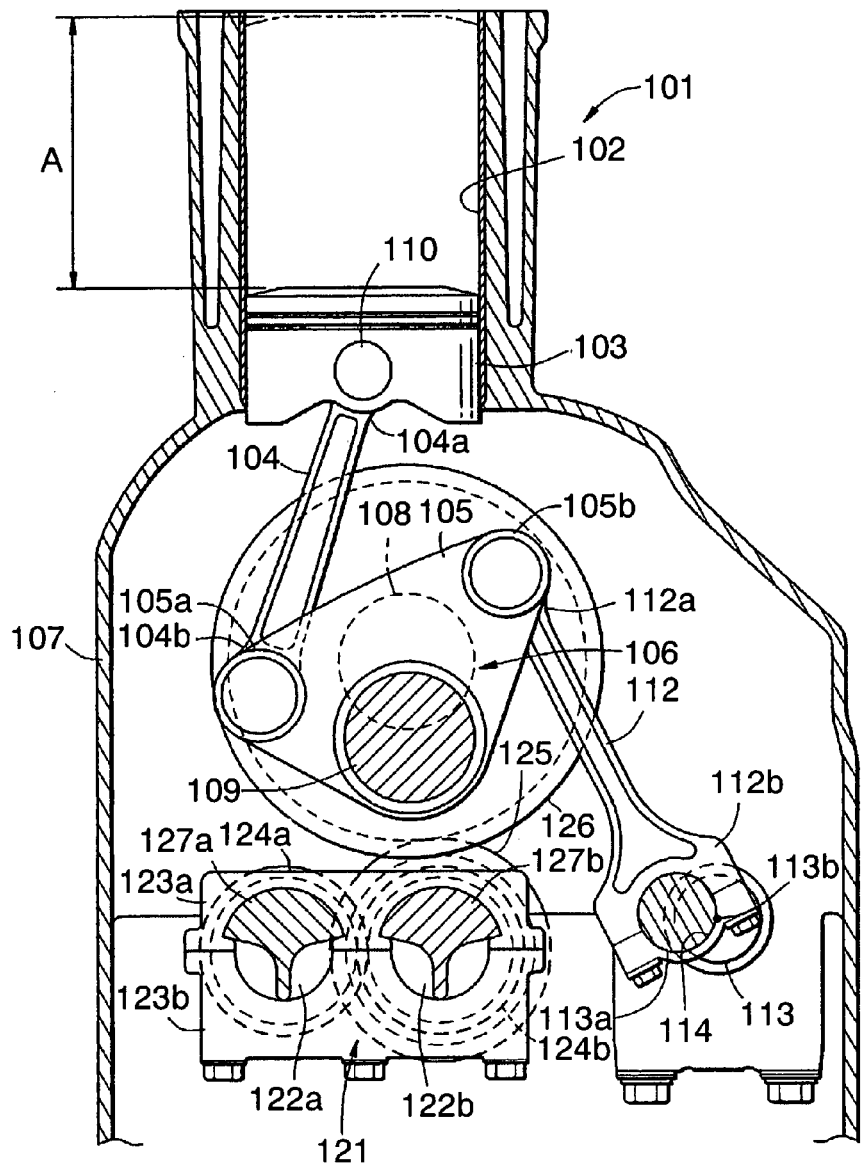
FIG. 19 is a vertical sectional view showing a piston bottom dead center position in the high compression ratio state of the engine (sixth embodiment).
Figure 20:
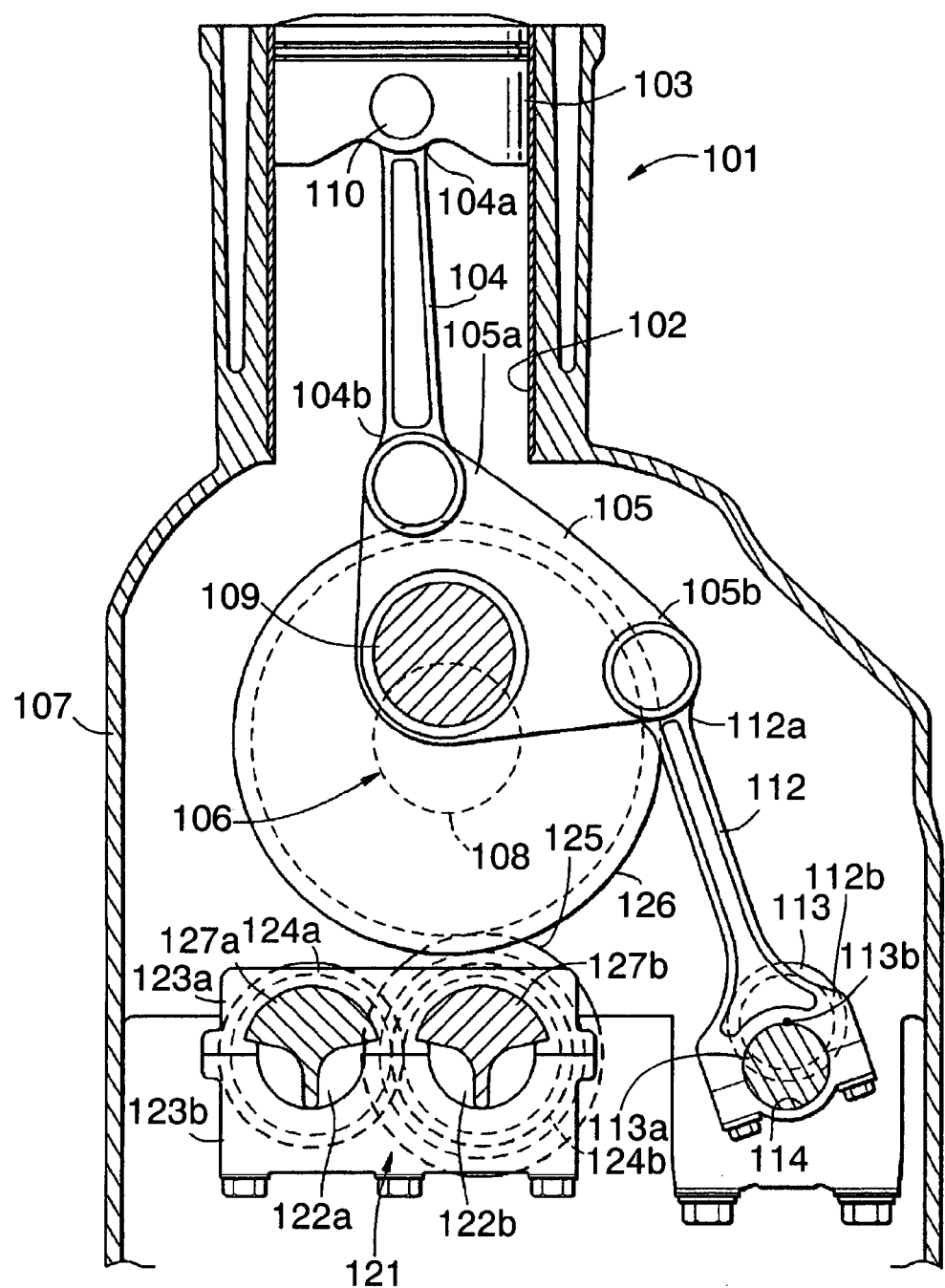
FIG. 20 is a vertical sectional view showing a piston top dead center position in a low compression ratio state of the engine (sixth embodiment).
Figure 21:
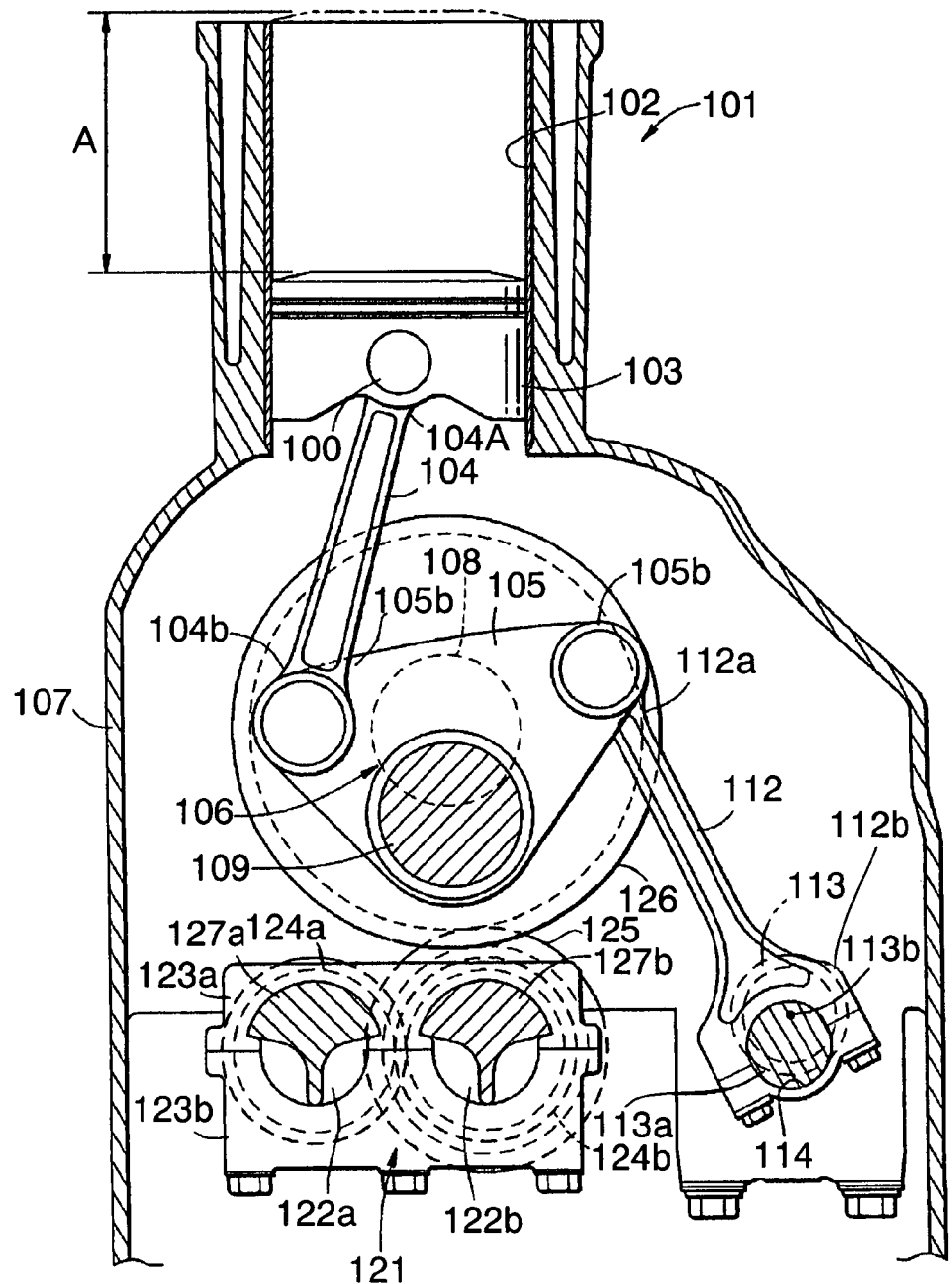
FIG. 21 is a vertical sectional view showing a piston bottom dead center position in the low compression ratio state of the engine (sixth embodiment).

In accordance with this engine 101, pivoting the eccentric shaft 113 changes the position of the big end portion 112b of the third link 112 between the position shown in FIG. 18 and FIG. 19 and the position shown in FIG. 20 and FIG. 21, thus changing the angle through which the second link 105 swings accompanying rotation of the crankshaft 106. The stroke range of the piston 103 within the cylinder 102, that is, the top dead center position and the bottom dead center position of the piston 103, change continuously between the range shown by Symbol A in FIG. 19 and the range shown by Symbol B in FIG. 21 according to this change in the swing angle of the second link 105. This enables a variable stroke characteristic function for continuously changing either one of the compression ratio or the displacement to be provided.

In this engine 101, a vibration reduction system is provided beneath the crankcase 107, the vibration reduction system counterbalancing secondary rotational vibration generated by operation of the link mechanism.

The vibration reduction system 121 is disposed at a position adjacent to the eccentric shaft 113, which extends within the crankcase 108 while being supported in the crankcase 108 and connected to the big end portion 112b of the third link 112.

The vibration reduction system 121 includes a pair of balancer shafts 122a and 122b, and split upper and lower casings 123a and 123b supporting and receiving these balancer shafts 122a and 122b. The pair of balancer shafts 122a and 122b are connected to each other by means of meshing (coupling means) between coupling gears 124a and 124b that have the same diameter and are provided integrally with the respective balancer shafts 122a and 122b, a driven gear 125 provided on one balancer shaft 124b meshes with a drive gear 126 provided on the crankshaft 106 (power transmission means), thereby transmitting the driving force of the crankshaft 106, and the balancer shafts 122a and 122b rotate in directions opposite to each other at a rotational speed that is twice that of the crankshaft 106. A chain/sprocket mechanism may be used as power transmission means between the crankshaft 106 and the balancer shafts 122a and 122b.

The drive gear 126 has a diameter equal to the diameter of a circular locus of rotation of a counter weight 111, which is a maximum diameter for a circular locus of rotation of the crankshaft 106, thus preventing the arrangement of the gear mechanism for transmitting the rotational force of the crankshaft 106 to the balancer shaft 122b from being particularly restricted. Furthermore, the coupling gears 124a and 124b for coupling the pair of balancer shafts 122a and 122b are provided at axial positions corresponding to the crank journal 108 between the first piston 103 and the second piston 103 in FIG. 22 and FIG. 23. Since a fixed bearing is provided on the crank journal 108, the coupling gears 124a and 124b for coupling the pair of balancer shafts 122a and 122b can be arranged without taking into consideration the positional relationship with other movable objects.

More specifically, the drive gear 126 for transmitting the rotational force of the crankshaft 106 to one balancer shaft 122b is provided integrally with one (right-hand side) of a pair of crank arms 111a corresponding to the crankpin 109 supporting the piston 103 that is second from the right in FIG. 22 and FIG. 23. The driven gear 125, which meshes with the drive gear 126, is integrally joined to the balancer shaft 122b, which is adjacent to the eccentric shaft 113. The drive gear 126 and driven gear 125 are disposed on another identical imaginary plane that is parallel to the imaginary plane on which both the first link 104 and the third link 112 move and that is spaced from this imaginary plane across an appropriate gap in the axial direction of the crankshaft 106. Furthermore, the coupling gears 124a and 124b are disposed adjacent to the driven gear 125 in the axial direction, and they also are disposed on another identical imaginary plane that is parallel to the imaginary plane on which both the first link 104 and the third link 112 move and that is spaced from this imaginary plane across an appropriate gap in the axial direction of the crankshaft 106.

This enables the drive gear 126, which has the largest diameter on the crankshaft 106, the driven gear 125, which has the largest diameter on the balancer shaft 122b, the coupling gears 124a and 124b, which are disposed adjacent to the driven gear 125, and the big end portion 112b of the third link 112 to move without interfering with each other, thus making it possible for the vibration reduction system 121 and the third link 112 to be disposed closer to each other and thereby avoiding increasing the dimensions of the engine.

Balancer weights 127a and 127b are provided on outer peripheral parts of the balancer shafts 122a and 122b, the balancer weights 127a and 127b having a predetermined phase and a predetermined inertial mass in order to counterbalance the amount of imbalance generated by movement of the link mechanism. The two balancer weights 127a and 127b are disposed at positions between the second piston and the third piston from the right, that is, in this embodiment at middle positions in the direction in which the cylinders are arranged in a four-cylinder engine.

The vibration reduction system 121 is disposed at a position adjacent to the big end portion 112b of the third link 112 toward the inside of the crankcase, the big end portion 112b being connected to the eccentric shaft 113 supported in the crankcase 107 and extending within the crankcase 107.

A stationary shaft center 113b of the eccentric shaft 113 is positioned lower than an upper end face of the upper housing 122a of the vibration reduction system 121 and, moreover, the range of movement of the eccentric portion 113a of the eccentric shaft 113 is established at a position opposite a side wall of the upper housing 122a. That is, the big end portion 112b of the third link 112 connected to the eccentric shaft 113 is positioned lower than an upper end face of the vibration reduction system 121.

Furthermore, the third link 112 is disposed at a position biased toward one direction perpendicular to the row of cylinders relative to the shaft center of the crankshaft 106, that is, the central axis of the crank journal 108, whereas the majority of the vibration reduction system 121 is disposed at a position biased toward the opposite side.

Such a layout avoids the dimensions of the crankcase of the engine increasing even when the multi-link variable stroke characteristic mechanism is combined with the vibration reduction system.

Moreover, whereas the third link 112 is disposed at a position biased toward one direction perpendicular to the row of cylinders relative to the axis of the piston 103, the vibration reduction system 121 is disposed substantially directly beneath the piston 103.

Furthermore, the stationary shaft center 113b of the eccentric shaft 113 is positioned lower than the upper end face of the upper housing 122a of the vibration reduction system 121 and, moreover, the range of movement of the eccentric portion 113a of the eccentric shaft 113 is established at a position opposite the side wall of the upper housing 122a.

More particularly, the eccentric shaft 113 has a similar shape to the crankshaft 106, and the stationary shaft center 113b thereof, relative to a plane that passes through the center of the balancer shaft 122b on the side closer to the eccentric shaft 113 and that is perpendicular to the sliding axis of the piston, is disposed at a position slightly biased toward the crankshaft 106 side (upward) with respect to the sliding direction of the piston. Since this enables the eccentric shaft 113 to be disposed at a position that avoids the position the outer periphery of the balancer shaft 122b reaches on the outermost side on the plane perpendicular to the sliding axis of the piston, the dimensions of the crankcase 107 are prevented from increasing.

Figure 24:
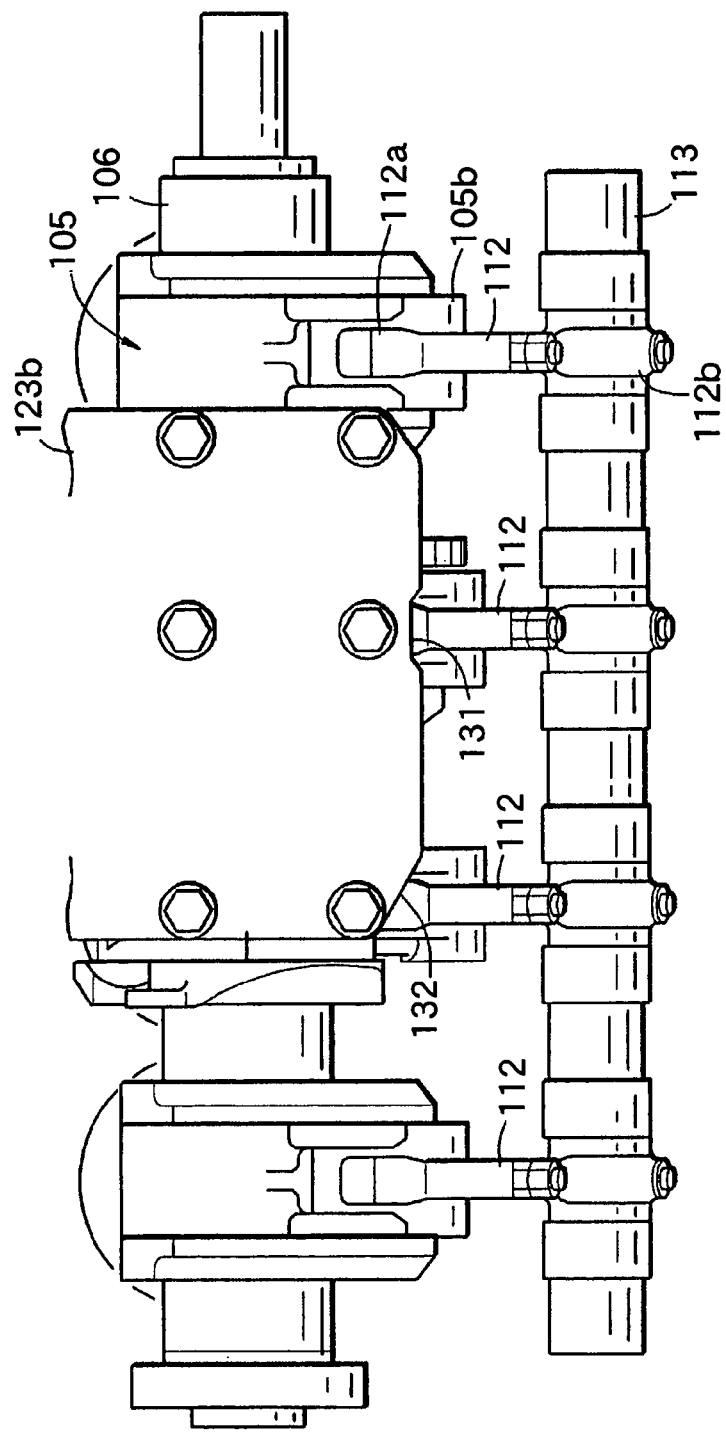
FIG. 24 is a bottom view of the engine internal mechanism including a balancer housing (sixth embodiment).

As shown in FIG. 24, with regard to the lower casing 123b, axially opposite end faces of its base wall are disposed at positions away from the third link 112 of each of the first and fourth cylinders, the third link 112 of the second cylinder faces a recess 131 formed in one edge of the base wall, and the third link 112 of the third cylinder faces a corner cutout part 132 on the axially left end side of the base wall. This enables the vibration reduction system 121 and each of the third links 112 to be disposed more closely adjacent to each other, thus preventing the dimensions of the crankcase 107 from increasing.

Such a layout avoids the dimensions of the crankcase of the engine increasing even when the multi-link variable stroke characteristic mechanism is combined with the vibration reduction system.

Embodiments of the present invention are explained above, but the present invention can be modified in a variety of ways as long as the modifications do not depart from the spirit and scope of the present invention.

For example, in each embodiment a variable compression ratio engine has been explained, but by changing the dimensions of each part in a similar structure an arrangement in which either one or both of the compression ratio and the displacement of the engine are variable is possible. The present invention may be applied to multi-link engines such as these variable stroke characteristic engines.

Furthermore, in the fifth embodiment, the phases of the first and second balancer shafts 44 and 45 can be changed independently by the first and second variable phase mechanisms 61 and 62, but the secondary vibration in various running states of the engine can be reduced quite effectively even if only the first variable phase mechanism 61 is provided and the phases of the first and second balancer shafts 44 and 45 are changed in an associated manner.

The invention claimed is:

1. An engine vibration elimination system that eliminates, by means of a balancer system, vibration of an engine in which a direction of vibration generated accompanying reciprocation of a piston is inclined relative to a cylinder axis,
   wherein the engine is a variable stroke characteristic engine in which at least one of top dead center and bottom dead center can be varied, the engine comprising:
   an upper link connected to the piston;
   a lower link connected to the upper link and a crankshaft;
   a control link connected at one of opposite ends thereof to the lower link and supported displaceably on an engine block at the opposite end via a control shaft; and
   an actuator for driving the control shaft, wherein
   said control shaft and said control link are positioned at one of opposite sides of the cylinder axis and downwardly of an upper end of said crankshaft, and wherein
   the balancer system is positioned downwardly of a lower end of said crankshaft and the balancer system generates an excitation force having a direction which is set such that the excitation force, when facing downwardly, is directed toward the one side of the cylinder axis and, when facing upwardly, directed toward the other side of the cylinder axis.

2. The engine vibration elimination system according to claim 1, wherein an angle that the direction of the excitation force generated by the balancer system forms relative to the cylinder axis coincides with an angle that the direction of the vibration generated accompanying reciprocation of the piston forms relative to the cylinder axis.

3. The engine vibration elimination system according to claim 1, wherein the balancer system comprises balancer weights supported on a pair of balancer shafts rotating in directions opposite to each other, and phases of the balancer weights are set so that the phase of one of said balancer weights is displaced from the other of said balancer weights by a predetermined angle and a straight line passing through centers of the pair of balancer shafts is disposed horizontally so that a direction of an excitation force generated by these balancer weights is inclined toward the direction of vibration generated accompanying reciprocation of the piston.

4. The engine vibration elimination system according to claim 1, wherein the direction of the excitation force generated by the balancer system is set so as to be between a direction of an excitation force for suppressing secondary vibration in a first running state of the engine and a direction of an excitation force for suppressing secondary vibration in a second running state of the engine.

5. The engine vibration elimination system according to claim 4, wherein the direction of the excitation force generated by the balancer system is set so that an amplitude of secondary vibration in the first running state is substantially equal to an amplitude of secondary vibration in the second running state.

6. The engine vibration elimination system according to claim 1, further comprising a variable stroke characteristic mechanism for changing the stroke characteristics of a piston according to a running state and a secondary balancer system for reducing secondary vibration accompanying reciprocation of the piston,
   wherein the secondary balancer system comprises a first balancer shaft driven by a crankshaft, a second balancer shaft driven by the first balancer shaft, and a variable phase mechanism for changing the phase of the first balancer shaft relative to the phase of the crankshaft according to a running state.

7. The engine vibration elimination system according to claim 6, wherein the system comprises a second variable phase mechanism for changing the phase of the second balancer shaft relative to the phase of the first balancer shaft according to a running state.

8. The engine vibration elimination system according to claim 3, wherein the balancer system is constructed such that one of the balancer shafts is connected to the crankshaft and the other of the balancer shafts is connected to said one balancer shaft and disposed on that side of said one balancer shaft that is opposite to said control shaft and said control link, and wherein when said other balancer weight faces in a vertically upward direction, said one balancer weight is inclined by a predetermined angle relative to said vertically upward direction toward a side opposite to said control shaft and said control link.

* * * * *